(12) United States Patent
Ting et al.

(10) Patent No.: US 11,691,216 B2
(45) Date of Patent: Jul. 4, 2023

(54) APPARATUS FOR MATERIALS PROCESSING

(71) Applicant: Avava, Inc., Waltham, MA (US)

(72) Inventors: Joseph Ting, Acton, MA (US); Charles Holland Dresser, Wayland, MA (US); Jayant Bhawalkar, Auburndale, MA (US)

(73) Assignee: Avava, Inc., Waltham, MA (US)

( * ) Notice: Subject to any disclaimer, the term of this patent is extended or adjusted under 35 U.S.C. 154(b) by 612 days.

(21) Appl. No.: 16/445,194

(22) Filed: Jun. 18, 2019

(65) Prior Publication Data

US 2019/0389000 A1 Dec. 26, 2019

Related U.S. Application Data

(60) Provisional application No. 62/688,848, filed on Jun. 22, 2018.

(51) Int. Cl.
*B23K 26/064* (2014.01)
*B23K 26/03* (2006.01)
(Continued)

(52) U.S. Cl.
CPC .......... *B23K 26/064* (2015.10); *B23K 26/032* (2013.01); *B23K 26/062* (2015.10); *B23K 2103/50* (2018.08)

(58) Field of Classification Search
None
See application file for complete search history.

(56) References Cited

U.S. PATENT DOCUMENTS

| 2005/0064137 A1* | 3/2005 | Hunt et al. | B23K 26/38 428/131 |
| 2007/0173581 A1* | 7/2007 | Hager et al. | C08K 3/22 524/430 |

(Continued)

FOREIGN PATENT DOCUMENTS

| GB | 2547862 A * | 8/2017 | ........... B23K 26/348 |
| WO | 2018/039248 A1 | 3/2018 | |

OTHER PUBLICATIONS

Taghrid Mhalla. Athcnnal micro-ablation of transparent materials by multiphoton absorption with au amplified Nd: Yag microchip laser generating green sub-nanosecond pulses. Materials Science [comlmat.mtrl-sci]. Universite Grenoble Alpes, 2015. English. NNT: 2015GREAY 059 . tel-01687375 (Year: 2015).*

(Continued)

*Primary Examiner* — Brian W Jennison
*Assistant Examiner* — Kevin Guanhua Wen
(74) *Attorney, Agent, or Firm* — Mintz Levin Cohn Ferris Glovsky and Popeo, P.C.

(57) ABSTRACT

A method includes depositing a plurality of dopant particles within a predetermined region of a transparent material. The method also includes focusing a laser beam along an optical axis to a focal region that overlaps with at least a portion of the predetermined region. The focal region can irradiate at least a first dopant particle of the plurality of dopant particles. The method further includes adjusting a parameter of the laser beam to generate a plasma configured to form an inclusion within the transparent material. The method additionally includes scanning the focal region along a path within the transparent material to elongate the inclusion generally along the path.

23 Claims, 34 Drawing Sheets
(22 of 34 Drawing Sheet(s) Filed in Color)

(51) Int. Cl.
  *B23K 26/062*  (2014.01)
  *B23K 103/00*  (2006.01)

(56) References Cited

U.S. PATENT DOCUMENTS

2016/0304386 A1    10/2016  Dong et al.
2017/0051386 A1*    2/2017  Carter et al. .............. C22F 1/10
2017/0326816 A1*   11/2017  Seepersad et al.  . B29C 67/0077

OTHER PUBLICATIONS

Varghese et al., Influence of Absorption Induced Thermal Initiation Pathway on Irradiance Threshold for Laser Induced Breakdown, Biomedical Optics Express, vol. 6, No. 4, Mar. 11, 2015, pp. 1234-1240 (Year: 2015).*

Sugioka, K., Cheng, Y. (2014). Fabrication of Microfluidic Structures in Glass. In: Femtosecond Laser 3D Micromachining for Microfluidic and Optofluidic Applications. SpringerBriefs in Applied Sciences and Technology. Springer, London, https://doi.org/10.1007/978-1-4471-5541-6_4 (Year: 2014).*

William W. Hansen, Siegfried W. Janson, and Henry Helvajian "Direct-write UV-laser microfabrication of 3D structures in lithium-aluminosilicate glass", Proc. SPIE 2991, Laser Applications in Microelectronic and Optoelectronic Manufacturing II, (May 9, 1997); https://doi.org/10.1117/12.273716 (Year: 1997).*

Dr. Thomas Herrmann and Bernhard Klimt, L. L. G. H. (Jun. 1. 2004). Slashing the costs of high-precision micromachining. Photonics Media. Retrieved Aug. 25, 2022, from htttps://www.photonics.com/Articles/Slashing_the_Costs_of_High-Precision/a19083 (Year: 2004).*

Mhalla, Athermal Micro-Ablation of Transparent Materials by Multiphoton Absorption with an Amplified Nd: Yag Microchip Laser Generation Green Sub-Nanosecond Pulses. Thesis. 2015. pp. III, 12, 17-18, 23-27, 37, 53-54, 60-63.

Varghese et al., "Influence of Absorption Induced Thermal Initiation Pathway on Irradiance Threshold for Laser Induced Breakdown," Biomedical Optics Express, vol. 6, No. 4, Mar. 11, 2015, pp. 1234-1240.

International Search Report and Written Opinion issued in corresponding International Application No. PCT/US2019/037821, dated Sep. 23, 2019, 9 pages.

* cited by examiner

APPARATUS FOR MATERIALS PROCESSING

CROSS-REFERENCE TO RELATED APPLICATIONS

This application claims the benefit of U.S. Provisional Application No. 62/688,848, entitled "Selective Plasma Generation in Industrial Applications," filed Jun. 22, 2018. The entirety this application is incorporated by reference.

BACKGROUND

Electromagnetic radiation (EMR) is commonly used in many industrial applications such as material processing. For example, EMR can be used to anneal, weld, cut, and etch target materials. Many of these industrial applications can require high EMR intensities to achieve the desirable effect on materials. In some cases, a target material may not efficiently interact with the target material (e.g., when the target material is transparent to the EMR). In such cases, the intensity of the EMR may need to be significantly increased in order to cause a desirable interaction between the EMR and the target material. For example, the intensity of the EMR may need to be set above a threshold value to cause non-linear interaction between the EMR and the target material. Generating a high intensity EMR (e.g., high intensity laser beam) can be challenging, inefficient and expensive.

An application for transparent media laser processing is manufacturing of microfluidic channels. Current microfluidic devices (e.g., microfluidic chips) are formed from multiple layers of material. Fluidic features such as channels are formed in the surface of a material using techniques such as micromachining, laser machining, molding, and embossing. These features are typically limited to layers in single plane. Because of lidding, these layers must be bonded after fabrication to seal the structures. Bonding is typically done using an adhesive or a combination of a solvent vapor, pressure, and temperature. Imperfections in the layers that affect flatness can make bonding extremely difficult and can lead to a high defect rate. Fabrication is typically done in a clean room environment to avoid particulate contamination which can affect device performance.

Disadvantages of these microfluidic device manufacturing processes are many and include: contamination resulting from the open channels, limited channel aspect ratios which constrain fluid throughput in the assembled chip, ability to process microfluidic channels at only one plane (e.g., only in 2 dimensions and not all 3 dimensions), and low yields during the lid bonding process.

Current microfluidic device manufacturing processes have the above drawbacks at large (e.g., production scale) and additional drawbacks during prototyping. Microfluidic flow exhibits little known behaviors that only manifest at micro-scale. For this reason, it is currently difficult to anticipate performance of a microfluidic device prior to manufacture. Prototyping and iterating prototypes is therefore required for a better understanding of microfluidic flow, and better performing microfluidic devices.

The microfluidic device prototyping process typically follows a number of steps, including molding and lidding. The drawbacks of current microfluidic device manufacturing processes during prototyping result from the current need to mold microfluidic devices when making them in small quantities.

Molding can accomplished through casting a 3D printed positive or by using a wet etching process. A mold incorporates a reverse impression of the feature of interest. For example, a deep channel in the molded part requires a raised wall in the mold which must be separated during the demolding process. A deep channel has higher flow capacity than a shallow channel. Deep channels are desirable since a larger amount of fluid, such as blood can flow through the channel.

However, molding imposes limits on the aspect ratio of features, the ratio of depth to width in the part. The width can control desired fluidic forces on a fluid. The tall, thin walls required to produce deep channels are fragile and may fracture during demolding. Furthermore, a tall wall has a relatively large surface area which increases adhesion with the molded part which can make the part hard to remove.

Furthermore, lidding is generally a multi-step process. As a result, it also slows and limits the prototyping process for microfluidic devices.

Thus, the prototyping and iterating process can be hampered by the current state of microfluidic device manufacture. A variety of approaches have been investigated in order to make advances to the current state of microfluidic device manufacturing, including photo-machining and sub-picosecond laser pulses.

Methods for photo-machining continuous channels into a surface of various transparent materials have been tried. However, these methods are only applied to the surface and therefore microfluidic channels made using these methods still requires lid bonding and the limitations associated with lid bonding. (Taghrid Mhalla, dissertation entitled "Athermal micro-ablation of transparent materials by multiphoton absorption with an amplified Nd:YAG microchip laser generating green sub-nanosecond pulses," 2015, herein incorporated by reference).

Another approach has been tried employing sub-ps laser pulses (e.g., femtosecond pulses) in order to achieve the sub-surface laser effects in transparent crystal and glass materials (e.g., quartz and sapphire). Laser irradiation is followed by days of chemical etching in an ultrasonic bath to form the channels. (J. Gottmann et al., "Selective Laser-Induced Etching of 3D Precision Quartz Glass Components for Microfluidic Applications—Up-scaling of Complexity and Speed," 2017, published in Micromachines, incorporated herein by reference). However, the costs associated with formation of femtosecond laser pulses and prolonged (e.g., days) chemical etching time has, thus far, prevented wide adoption of this technology for micro-fluidic channel formation.

Finally, efforts have been made to produce microfluidic channels directly (without post-laser etching), sub-surface, in an un-doped transparent material. (Aymen Ben Azouz's dissertation titled "Microfluidic Device Prototyping via Laser Processing of Glass and Polymer Materials," 2013, incorporated herein by reference). Azouz presents subsurface laser formed internal channels in polycarbonate (PC) using pulse durations longer than 1 picosecond. However, PC exhibits incubation from sequential laser pulses. This incubation results in formations of dark (i.e., light absorbing) carbonaceous species from degradation of the PC during irradiation. Although, this incubation serves to increase laser absorption (for following pulses), it also limits functionality of a resulting channel because many microfluidic applications rely on transparency of the surrounding chip to make optical measurements (e.g., cell counting). Carbonaceous species about a formed channel resulting from incubation in PC prevent transparent viewing of fluids within the void and precludes this microfluidic channel formation technique for many microfluidic applications. Furthermore, it is not well understood if the channels formed in this manner will allow for microfluidic flow within them, as it is possible that the resulting carbonaceous species will occlude the channels in practice.

It is therefore desirable that a manufacturing method be devised that allows for the high-yield production of contaminant-free microfluidic devices having large aspect ratio channels and channels in more than a single plane.

SUMMARY

Light or optical energy of certain wavelengths can interact with and transfer optical energy to materials (e.g., materials transparent to visible light). The transfer of optical energy from electromagnetic radiation (EMR) (e.g., a laser beam) can lead to plasma generation by one or more of ionization (e.g., multiphoton ionization), heating, laser induced optical breakdown (LIOB), and laser induced thermal breakdown (LITB) in the target material. The generated plasma can be used to process (e.g., anneal, weld, cut, etch, etc.) the target material. Adding a dopant to the target material can reduce a minimum laser intensity required for LIOB ("threshold LIOB intensity"), and/or reduce a minimum laser intensity required for LITB ("threshold LITB intensity"). Lowering of threshold intensities for laser induced breakdown within predetermined regions of the target material (e.g., regions of the target material where dopants have been added) can allow for selective plasma generation in the predetermined regions. Selective plasma generation can allow for selective treatment of the target material.

Lasers can be used in an industrial environment to increase productivity and efficiency. Transparent materials such as glass can transmit the laser energy (e.g., in the visible or near visible wavelength) rather than absorbing it. For this reason, many laser technologies, using the visible or near-visible wavelengths are either not used for processing transparent materials, or are used at high peek powers (and high fluences) to induce optical breakdown in the transparent material. Mid-IR lasers such as CO2 lasers having ~10.6 micrometer wavelength may be used to cut some transparent materials (e.g., plastics). Presently, a large market for transparent medium processing is driven at least in part by flat panel display and electronics manufacturers.

In many manufacturing or materials processing processes, width of cut (or kerf) created by the laser beam on a target material plays a role in the efficiency of production. This is because the greater the width of cut, the greater the amount of target material that is wasted. For this reason, manufacturers using laser cutters can at times use small beam size. The smallest transverse size of a laser beam is at its waist (or focus). The minimum waist size for a laser is a function of the wavelength of the laser (such that a smaller wavelength results in a smaller waist) and the quality of the laser beam.

A recent advancement in laser technology is the fiber laser. Fiber lasers can have good beam quality, have high energy efficiencies, and have wavelengths in the visible and near-visible range (e.g. 1064 nm). Fiber lasers are therefore an attractive option for material manufacturing because of the short wavelength, high beam quality, and high energy efficiencies. However, fiber lasers are generally unable to handle large peak powers, like those required to induce optical breakdown in a transparent medium. Therefore, advantages of using a fiber laser (e.g., high efficiency, good beam quality, etc.) are yet to be realized in the processing of transparent media.

Accordingly, improved methods, systems, and devices for EMR-based (e.g., laser-based) selectively generating plasma in desirable regions of the target material are provided.

A method includes depositing a plurality of dopant particles within a predetermined region of a transparent material. The method also includes focusing a laser beam along an optical axis to a focal region that overlaps with at least a portion of the predetermined region. The focal region can irradiate at least a first dopant particle of the plurality of dopant particles. The method further includes adjusting a parameter of the laser beam to generate a plasma configured to form an inclusion within the transparent material. The method additionally includes scanning the focal region along a path within the transparent material to elongate the inclusion generally along the path.

Embodiments of the inclusion can adopt a variety of configurations. In one aspect, the inclusion has a transverse height substantially along the optical axis and a transverse width orthogonal to the transverse height and the path. In another aspect, the inclusion has an aspect ratio equal to the transverse height divided by the transverse width. The aspect ratio can be within a range from about 0.05 to about 500. In another aspect at least one of the transverse height and the transverse width is within a range from about 0.5 μm to about 500 μm and the inclusion includes a void, which is configured to provide fluidic communication. In another aspect, at least one of the transverse height and the transverse width has a value within a range from about 0.05 μm to about 5000 μm. In another aspect, the inclusion includes a localized change in the physical, mechanical, or optical properties of the material. In another aspect, the inclusion includes a void configured to conduct fluid, electrical energy, or thermal energy. That is, the inclusion can be an electrically or thermally conductive channel. In a further aspect, the inclusion can include a selectively conductive optical light path.

In another embodiment, the path includes a component vector that is substantially parallel to the optical axis.

In another embodiment, the path includes 3 orthogonal component vectors.

In another embodiment, the plasma is generated within the dopant particle.

In another embodiment, the plasma is generated in via laser induced thermal breakdown (LITB).

In another embodiment, the plasma is generated via laser induced optical breakdown (LIOB).

In another implementation, adjusting the parameter of the laser beam includes adjusting at least one of a power, a pulse energy, a repetition rate, a pulse duration, and a wavelength of the laser beam.

In another embodiment, the plurality of dopant particles can include at least one of silicon, silver nanoparticles, metal nanocomposites, dendritic molecules, chromophores, and metal oxide nanoparticles.

In another embodiment, the transparent material is a polymer, a glass, and a crystal.

In another embodiment, the inclusion includes a microfluidic channel.

In another embodiment, the method further includes introducing a fluid into the inclusion, wherein the fluid is configured to remove material from walls of the inclusion. The fluid can include at least one of a liquid, a gas, a solvent, and an abrasive.

In another embodiment, the method further includes introducing a vacuum to the inclusion.

In another embodiment, the method further includes heating the transparent material to a predetermined temperature.

In another embodiment, the method further includes scanning the focal region of the laser beam along a first path in the predetermined region. Scanning the focal region along the first path can be configured to generate a microfluidic channel, a physical opening, or other inclusion such as a localized change in the optical or mechanical properties of the material by the generated plasma.

Embodiments of the inclusion can adopt a variety of configurations. In one aspect, the inclusion can be a continuous void configured to conduct fluid. In another aspect, the inclusion can be a continuous channel of material with altered material properties that may preferentially conduct light with a predetermined wavelength.

In one embodiment, a system is provided. The system can include a mount, a focus optic, a controller and a scanner. The mount can be configured to secure a transparent material having a predetermined region deposited with a plurality of dopant particles. The focus optic can be configured to focus a laser beam along an optical axis to a focal region that overlaps with at least a portion of the predetermined region. The focal region can irradiate at least a first dopant particle of the plurality of dopant particles. The controller can be configured to adjust a parameter of the laser beam to generate a plasma in order to form an inclusion within the transparent material. The scanner can be configured to scan the focal region along a path within the transparent material to elongate the inclusion generally along the path.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the disclosure will be more fully understood from the following detailed description taken in conjunction with the accompanying drawings, in which.

Figure 1:
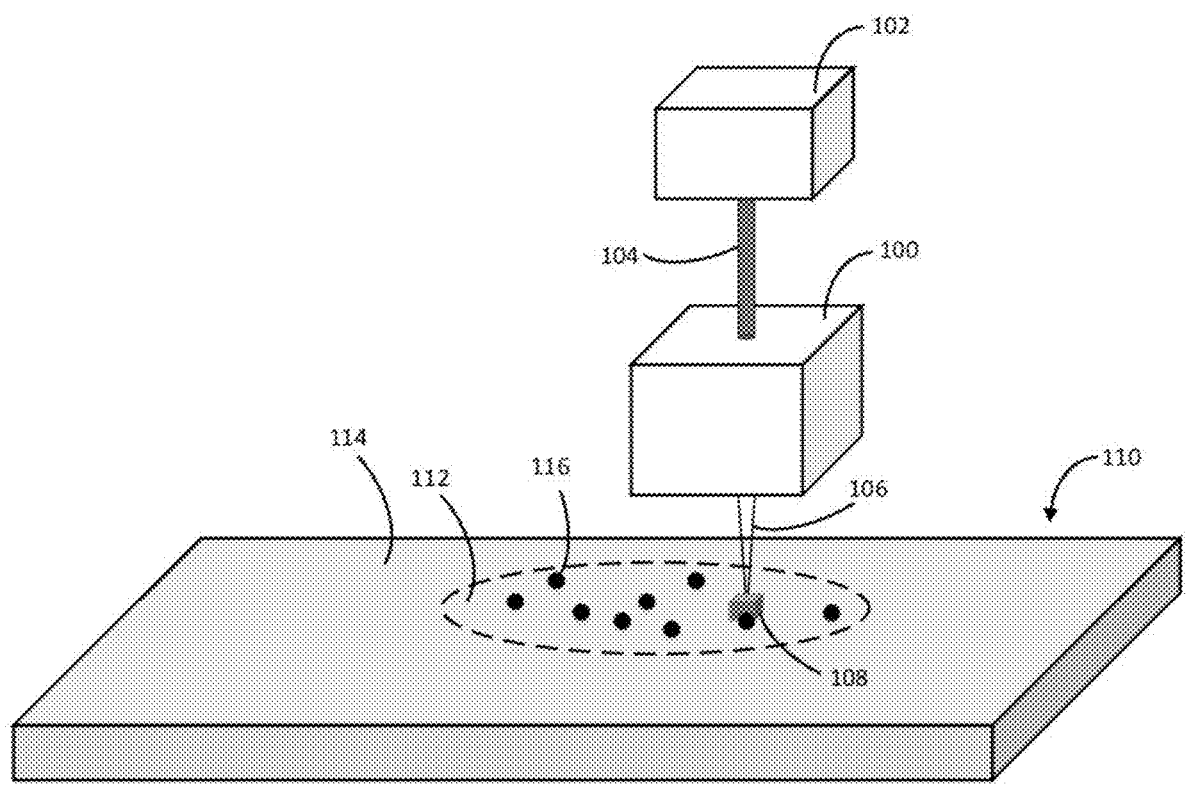
FIG. 1 is a schematic illustration of an exemplary optical system for selective plasma generation in a target material.

It is noted that the drawings are not necessarily to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

A laser beam can interact with a material to generate a plasma within the material and this plasma can be used to process (e.g., deform, cut, etch, etc.) the material. Plasma can be generated through a variety of mechanisms. Such mechanisms can include laser induced breakdown, such as laser induced optical breakdown (LIOB) and laser induced thermal breakdown (LITB).

In LIOB, a high intensity laser beam is applied to the material. Due to the high intensity of the laser beam, the atoms/molecules of the material can absorb multiple laser photons (e.g., via non-linear absorption) that can lead to ionization of electrons from the atoms/molecules and formation of the plasma.

Alternately, plasma can be generated via laser induced thermal breakdown (LITB). LITB is a thermo-physical process which is distinct from LIOB. LITB can be initiated by heating a target material by a laser beam. This can lead to ionization of the atoms/molecules of the target material to generate thermal electrons. The thermal electrons can rapidly re-combine with the ionized molecules from which they came. However, under appropriate conditions, the thermal electrons can also absorb incoming photons from the laser beam/EMR instead of recombining, resulting in thermionic plasma formation.

Thermionic plasma initiation can depend on the ability to liberate thermal electrons from atoms/molecules of the target material. Molecules having weakly-bound electrons are more likely to generate thermionic plasma when heated compared to molecules without weakly-bound electrons. Usually, the laser intensity needed for generating plasma via LIOB is higher than that for generating plasma via LITB (e.g., by several orders of magnitude). For example, in some embodiments, LITB may be generated with peak intensities of about $10^9$ W/cm$^2$ and LIOB may be generated with peak intensities of about $10^{12}$ W/cm$^2$.

Generation of plasma via LIOB and LITB can be enhanced in the presence of a dopant in the target material. In some implementations, the dopant (e.g., metal nanocomposites, dendrimers, metal nanoparticles, dyes, pigments etc.) can modify the electric field of the laser beam (e.g., in a region surrounding the dopant). This can reduce the laser intensity needed to generate plasma via LIOB. In other implementations, a dopant (e.g., a chromophore) can have a lower ionization threshold than the ions/molecules of the surrounding target material. This can result in initiation of thermionic plasma formation (e.g., by linear absorption of laser photons, by heating, etc.) at lower laser intensities. In certain embodiments, the diameter of the nanoparticles can be less than the wavelength of the EMR (e.g., about 0.1 nm to about 1000 nm).

The efficacy of heating a dopant to initiate a thermionic plasma depends in part on energy density of the laser beam. The energy of a laser pulse in the laser beam is the time integral of laser power. Femto- and pico-second laser pulses, which can initiate dielectric breakdown in very short time intervals, tend to have an energy density that is below that needed for thermionic plasma initiation because of the very short duration of the pulses. Longer pulse durations, even those in the microsecond (µs) domain (a million times longer than the femtosecond (fs) domain), can initiate thermionic plasma formation under conditions where a suitable dopant is present and the local power density is sufficiently high. The pulse energy can be focused to a degree to provide a sufficiently high local energy density in the tissue.

Embodiments of systems and methods described herein can be configured to focus the EMR in a highly convergent beam. For example, one embodiment of the system can include a focusing or converging lens arrangement having a numerical aperture (NA) selected from about 0.3 to 1 (e.g., between about 0.5 and 0.9). The convergence angle of the EMR resulting from the NA can be relatively large, and it can provide a high fluence and intensity in the focal region of the lens, which can be located at a region inside the target material. Concurrently, a lower fluence can be present in the overlying portions of the target material located upstream from the focal region. Such focal geometry can help reduce unwanted heating and thermal damage in the overlying portions of the target material. The exemplary optical arrangement can further include a collimating lens arrangement configured to direct EMR from the emitting arrangement onto the focusing lens arrangement. The collimating lens arrangement can ensure that the EMR beam emerging from the laser arrangement has a uniform cross-section as it propagates (e.g., propagates through an optical system).

Embodiments of optical systems employed within the system can be configured to focus the EMR to a focal region of predetermined size. As an example, the focal region can possess a width or spot size that is less than about 500 µm, for example, less than about 100 µm, or even less than about 50 µm, e.g., as small as about 1 µm. For example, the spot size can range from about 1 µm to about 50 µm, from about 50 µm to about 100 µm, from about 100 µm to about 200 µm, from about 200 µm to about 300 µm, and from about 300 µm to about 400 µm, from about 400 µm to about 500 µm. The spot size of the focal region can be determined, for example, in air. Such spot size can be selected as a balance between being small enough to provide a high fluence or intensity of EMR in the focal region (e.g., to effectively irradiate a doped region of a target material, etc.), and being large enough to facilitate irradiation of large regions/volumes of the target material in a reasonable time. The exemplary optical arrangement can also be configured to direct the focal region of the EMR onto a location within the target material that is at a depth below the surface of the target material, such as in the range from about 1 µm to about 10000 µm, e.g., between about 1000 µm to about 5000 µm.

In certain embodiments of the present disclosure, EMR at one or more wavelengths can be focused into the target material, such that the optical energy is selectively absorbed by regions of the target material containing dopants. In certain embodiments, the EMR can be pulsed and/or scanned. Such linear absorption of the optical energy can lead to local thermionic emission of electrons. With appropriate selection of optical energy parameters and beam geometry, further irradiation of the target material can lead to further energy absorption by the emitted electrons, followed by local plasma formation and non-linear absorption of energy. This procedure can produce intense heat, local expansion, stress waves such as strong acoustic or shock-waves, and/or chemical reactions due to the plasma in the dopant-containing region of target material.

In exemplary embodiments of the present disclosure, laser-induced plasma can be generated (e.g., via LIOB, LITB, etc.) in the focal region within the target material, based in part on selective absorption of the optical energy by dopants in the target material. Thermionic plasma formation requires a threshold level of power and energy density at the site where a dopant is present. For thermionic plasma formation, the focal region within the target material can be scanned to initiate plasma formation at a depth defined by the laser focus geometry, and such plasma can be selectively formed only at sites where a dopant is present. In this manner, a focused, scanned laser can be used to selectively affect well-defined regions in the target material that contain dopants (e.g., within one or more focal planes).

The focal region size/width, quality, and length along the beam axis of a focused laser beam directed into a target material can be determined by factors such as one or more of the laser beam divergence, laser mode structure, numerical aperture of the beam focusing optics, aberrations of the focusing optics, coupling of the beam into tissue at the tissue surface (e.g. surface reflection and refraction effects), and optical scattering properties of the tissue.

As discussed herein, the term "Rayleigh range" can include its ordinary meaning as understood by one of skill in the art and it can be used to describe the extent or length of a focal region along the optical axis. For example, the Rayleigh range can describe the size of a focal region along the depth or z axis for a beam directed into target material. The Rayleigh range is affected by such factors, e.g., as the laser source divergence, wavelength of the optical energy, laser mode(s), original diameter of the beam prior to convergence by optical elements, and numerical aperture of the focusing system. For example, a highly-convergent beam, where the outer boundaries of the beam converge at a relatively large angle as the beam reaches the focal region (and diverge at a similar angle beyond the focal region), can exhibit relatively small Rayleigh length. A smaller focused convergence angle can lead to a larger Rayleigh range, as the beam converges and diverges slowly with respect to distance along the beam axis. Typically, the Rayleigh range is several times larger than the transverse focal spot diameter.

By varying the focusing optical design and/or laser mode structure, a wide variety of laser focal spots can be produced. These focal spots can be characterized by geometrical parameters such as spot size or width (e.g., a characteristic dimension perpendicular to the axis of the beam in the focal region), and the Rayleigh range (e.g., a dimension of the focal region along the longitudinal axis of the beam). The appropriate dimensions of a focal region for selectively initiating plasmas in target material (via thermionic emission) can be selected based on factors such as the size of the dopant being targeted, the pulse energy and power of the optical energy source (which, together with the size of the focal region will affect local power and energy densities), the Rayleigh range (which will further affect the range of depths that can be scanned within a volume of target material in a particular time interval), etc.

Exemplary embodiments of the present disclosure can provide devices and methods for selectively producing plasma in a desired (e.g., predetermined) portion of a target material (e.g., a transparent material) using a laser beam. This can be done, for example, by adding a dopant to a region of the target material ("doped region"). Addition of the dopant can reduce the threshold intensity of the laser beam required to generate plasma in the doped region (e.g., via LIOB, LITB, etc.). As a result, plasma can be generated in the doped region using a laser beam of lower intensity compared to a region of the target material that has not been doped (e.g., an undoped region). This can allow for selective plasma generation in the target material. For example, a laser beam having an intensity below a threshold intensity (e.g., LIOB threshold intensity for undoped region, LITB threshold intensity for undoped region, etc.) will generate a plasma when interacting with the doped region, and will not generate a plasma (or generate only a negligible amount of plasma) when interacting with the undoped region.

FIG. 1 is a schematic illustration of an exemplary optical system 100 configured to perform selective plasma generation in a target material. The optical system 100 can receive a laser beam 104 from a laser source 102. The optical system 100 includes an objective (not shown) that can focus the laser beam 104 and directs a focused laser beam 106 to a focal region 108 in the target material 110.

The target material 110 can include a doped region 112 and an undoped region 114. The doped region can include a plurality of dopants 116. The dopants 116 can be added to the target material 110 by one or more doping techniques such as diffusion doping, ion implantation, in-situ doping, etc. The concentration of the dopant in the doped region 112 can be varied. The dopant concentration can determine the threshold LITB/LIOB intensity of a laser beam required to generate plasma in the doped region 112.

According to some embodiments, when the target material 110 is in the form of a thermoplastic material, the plurality of dopants 116 are added before or during polymerization of the target material 110. For example, the plurality of dopants 116 in a liquid form (e.g., dispersed in a volatile solvent) may be added to a liquid monomer of the target material 110. Once the liquid monomer undergoes polymerization the dopant will be contained within the resulting solid polymer. Alternatively, the dopant may be added through compounding. Compounding involves mixing the dopant with the pellets of the thermoplastic material, melting and mixing the materials, and re-solidifying, the re-pelletizing.

According to other embodiments, when the target material 110 is in the form of a porous material (e.g., porous glass, such as CoralPor from SCHOTT), the plurality of dopants 116 are added by submerging the porous material in the plurality of dopants 116. The plurality of dopants 116 can include, for example, silicon, metal nanoparticles (e.g., silver nanoparticles), metal nanocomposites, dendritic molecules, and pigments that absorb energy at a predetermined laser wavelength. As the objective moves (e.g., relative to the optical system 100 and/or due to movement of the entire optical system 100), the focal region 108 can trace a path through/along the target material 110. For example, the focal region 108 can travel from the doped region 112 to the undoped region 114 or vice versa. The intensity of the focused laser beam 106 can be adjusted such that plasma is generated in the doped region 112, and not generated (or generated to a much smaller degree compared to the doped region 112) in the undoped region 114. The threshold LITB/LIOB intensity can be lower in the doped region 112 compared to the undoped region 114. By adjusting the intensity of the focused laser beam 106 to a value between the threshold LITB intensity of the undoped region 114 and the threshold LITB intensity of the doped region 112, thermionic plasma can be selectively generated in the doped region 112. Similarly, by adjusting the intensity of the focused laser beam 106 to a value between the threshold LIOB intensity of the undoped region 114 and the threshold LIOB intensity of the doped region 112, plasma from optical breakdown can be selectively generated in the doped region 112. In some implementations, selective plasma generation (e.g., in the doped region) can be achieved by varying one or more of power, pulse energy, pulse duration, and wavelength of the focused laser beam 106.

Interaction between the focused laser beam 106 and the dopant 116 can lead to generation of plasma in and/or around the plurality of dopants 116 (e.g., in a volume surrounding the plurality of dopants 116). For example, plasma can be initiated by ionization of an electron from the plurality of dopants 116 by the focused laser beam 106, which in turn can cause ionization of other dopants and/or atoms (or molecules) of the target material 110. In some implementations, plasma can be generated in and/or around the plurality of dopants 116 by LIOB. The generated plasma (e.g., via LIOB, via LITB, etc.) can propagate in the target material (e.g., along the direction of propagation of the focused laser beam 106). The propagating plasma can ionize atoms/molecules of the target material (e.g., by electron impact dissociation).

Figure 2:
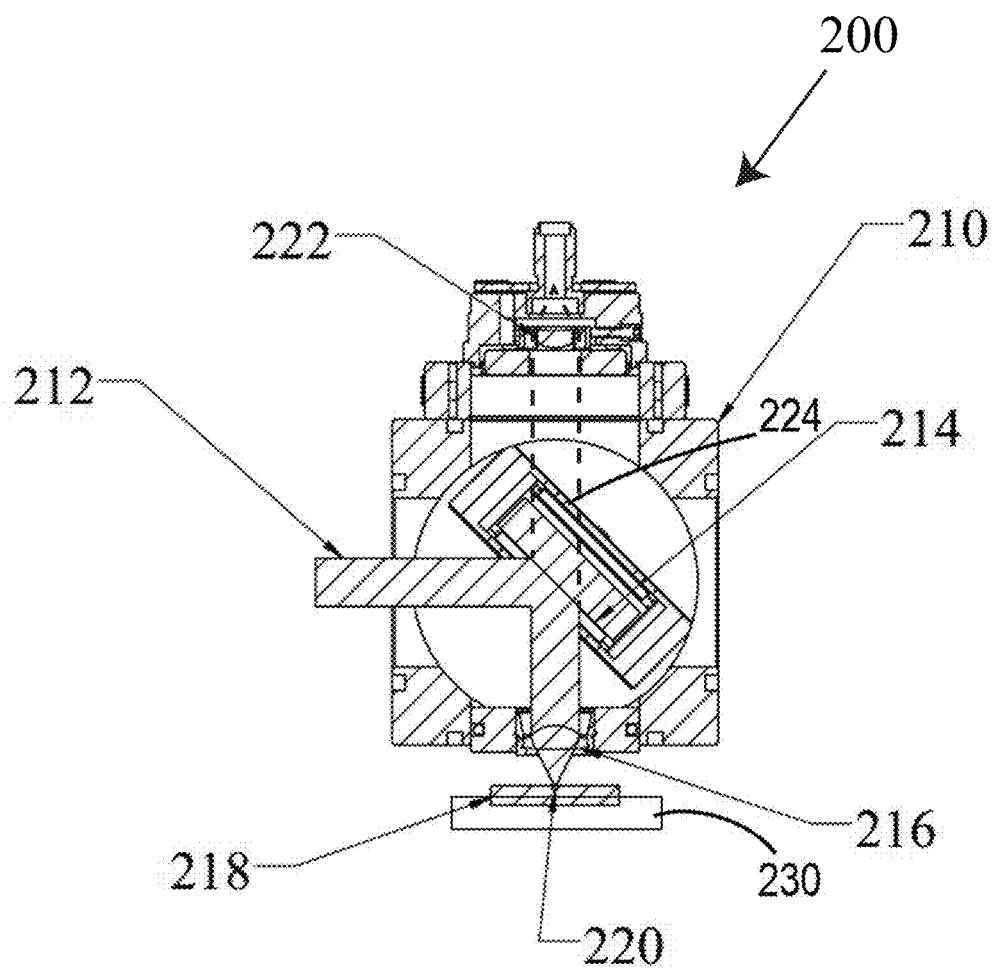
FIG. 2 is a schematic illustration of an exemplary optical system.

FIG. 2 is a schematic illustration of an one embodiment of the optical system 100 in the form of optical system 200. The optical system 200 includes a beam combiner 210 configured to receive a collimated laser beam 212. The beam combiner 210 includes a reflector 214 that reflects the incident laser beam 212. The reflector 214 is selected to reflect light having a predetermined wavelength range. For example, the laser beam 212 has a wavelength of 1060 nm, and the reflector is a Thorlabs NB1-K14, which is 99.5% reflective over a range of wavelengths from about 1047 nm to about 1064 nm.

The reflected laser beam 212 is imaged and focused by a focus optic 216. An example focus optic 216 is a Thorlabs C240TME-C, which is an aspheric lens capable of diffraction limited performance, and has an NA of 0.5 and an effective focal length of 8 mm. The laser beam 212 is focused to a waist (e.g., focal volume) in a target material 218. At the waist of the laser beam 212, a plasma plume 220 is generated within the target material sample 218. Radiation 224 generated from the plasma plume 220 is imaged by the focus optic 216 and is transmitted through the reflector 214.

After transmission through the reflector 214, radiation 224 is imaged into a first end of a fiber optic (not shown) by a fiber coupler 222. An example of the fiber coupler 222 is a Thorlabs PAF-SMA-7-A.

A second end of the fiber optic 216 is coupled to a spectrometer (not shown), for example an Ocean Optics HR2000+ ES. In another implementation, a notch filter (not shown) is included between the reflector 214 and the fiber coupler 222 to block portions of the radiation 224 having a wavelength similar to that of the laser beam 212 from entering the fiber optic 216. The target material 218, is mounted on motorized staging 230. A working distance between the target material 218, and the focus optic 216, is maintained to control a depth of the waist of the laser beam 212 within the target material 218.

Figure 3:
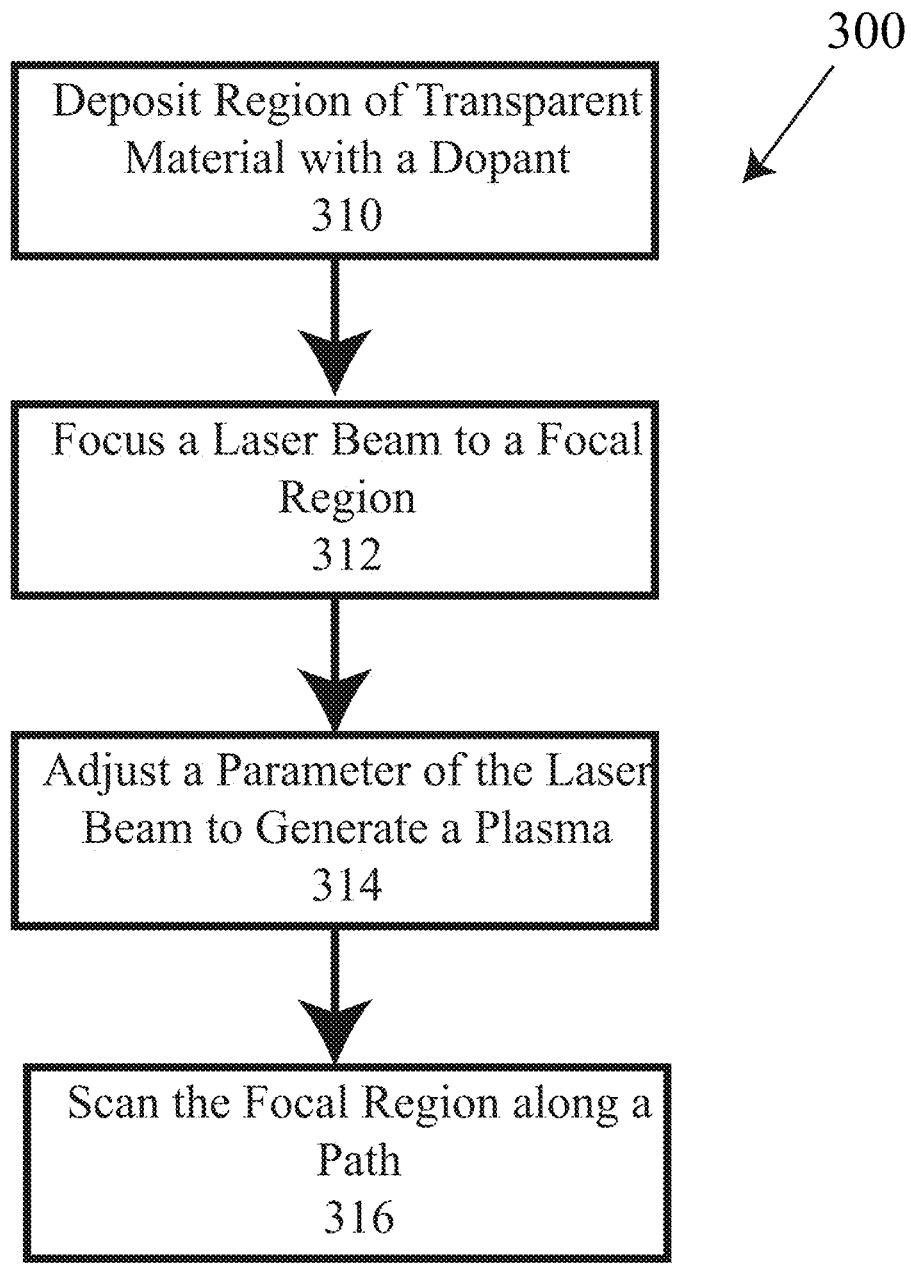
FIG. 3 is a flow diagram illustrating one exemplary embodiment of a method for selective plasma generation in a transparent material.

FIG. 3 illustrates an exemplary method 300 for selective plasma generation (e.g., in a predetermined region) of a target material (e.g., target material 110). As discussed above, examples of the target material 110 can include transparent materials (e.g., polymer, acrylic, glass, crystal, etc.) At 310, a plurality of dopant particles (e.g., plurality of dopants 116) are deposited in a predetermined region (e.g., doped region 112) of the transparent material. Examples of the plurality of dopants 116 include, but are not limited to, nanoparticles, nanocomposites, dendritic molecules, and chromophores. The predetermined region can correspond to the portion where the transparent material needs to be processed/modified (e.g., cut, etched, etc.) However, it can be understood that, in alternative embodiments, the predetermined region may be selected at any point within the transparent material without limit. For example, the transparent material may be doped throughout its entirety.

At 312, a laser beam is focused generally along an optical axis (e.g., focused laser beam 106) to a focal region (e.g., focal region 108) that overlaps with at least a portion of the predetermined region (e.g., doped region 112). The focal region of the laser beam can correspond to a region where the intensity of the laser beam is above a threshold value (e.g., $10^8$ W/cm$^2$) or at a waist of the laser beam (e.g., a portion of the laser beam in a Rayleigh range). At least a first dopant particle of the plurality of dopant particles 116 is irradiated within the focal region 108. That is, the focal region 108 can overlap with at least a portion of the doped region 112.

At 314, a first parameter of the laser beam (e.g., intensity, wavelength, power, pulse energy) can be adjusted to generate plasma within the transparent material. The plasma may be generated in a plasma volume comprising the first dopant particle. The plasma volume can be, for example, a volume surrounding a dopant particle (e.g., one or more of the plurality of dopant particles 116). The plasma volume may overlap with the focal region 108. The plasma can be generated 314 by at least one of laser induced thermal breakdown (LITB) and laser induced optical breakdown (LIOB).

According to some embodiments, the plasma forms an inclusion within the transparent material. The inclusion may include a void, a disruption (e.g., a thermal disruption, a photo disruption), and a chemical change. The inclusion may be formed entirely within the transparent material, such that the inclusion is entirely bounded by the transparent material. Alternatively, the inclusion may be formed at a boundary (e.g., surface) of the transparent material.

At 316, the focal region is scanned within the transparent material along a scan path. The scan path may include a component that is substantially along the optical axis (e.g., z-axis or depth). The scan path may also include components in all three axes (e.g., three-dimensional [3D] scanning). According to some embodiments, scanning the focal region 316 can propagate the plasma or form additional plasmas at additional locations, resulting in an elongation of the inclusion. Typically, the inclusion elongates substantially along the path. In some embodiments, the inclusion is continuous and uninterrupted within the transparent material. Alternatively, the inclusion may be interrupted or comprise a series of smaller sub-inclusions separated by material along the scan path.

In some embodiments, the inclusion may have a transverse height (e.g., substantially along the optical axis) and a transverse width (e.g., substantially along an axis perpendicular to the scan path and the optical axis). At least one of the transverse height and the transverse width may have a value within a range of 0.05 μm and 5000 μm. In some embodiments, the transverse height of the inclusion is proportionally related to the Rayleigh range of the focal region; and, the transverse width of the inclusion is proportionally related to a diameter of the focal region. The inclusion may be said to have an aspect ratio that is equal to the transverse height divided by the transverse width. In some embodiments, the aspect ratio is between about 0.05 to about 500. In some embodiments, the inclusion can be in the form of a microfluidic channel that is configured to affect a fluid for example by: flowing, filtering, or separating. That is, the width and height of the microfluidic channel can be configured to permit functioning as a microfluidic device (e.g., microfluidic chip).

Embodiments of the method can optionally include one or more additional steps. For example, in some embodiments, after the inclusion is elongated a fluid can be introduced to the inclusion. The fluid may remove debris from the inclusion (e.g., forming a void). For example, in some embodiments, the fluid is a solvent or an abrasive fluid. In some embodiments, the fluid may be a liquid, a vapor, or a gas. Additionally, a vacuum may be added to the inclusion to aid in the removal of debris (e.g., forming a void).

In another additional step, in some embodiments, the transparent material has a temperature that is elevated prior to focusing the laser beam 312. In some embodiments, the transparent material is an amorphous or semi-crystalline material and the temperature is elevated to soften the material. For example, the temperature may be elevated to a transition temperature (e.g., a glass transition temperature or softening temperature). In some embodiments, softening the transparent material allows for ablation debris from plasma generation 314 to be more completely incorporated into walls surrounding the inclusion, or allow the material to yield away from the inclusion. In some embodiments, the material yielding away from the inclusion reduces a density of the inclusion (e.g., forming a void).

Laser Parameter Selection

One or more parameters (e.g., laser beam parameters) may be adjusted to produce a plasma 314, and/or affect other aspects of processing (e.g., control resulting inclusion shape/size and continuity) It has been found that successful processing of a doped transparent material through laser induced plasma can require selection of parameters within predetermined ranges. In order to aid in parameter selection, adjustable parameters and their corresponding effects are enumerated below.

Figure 4:
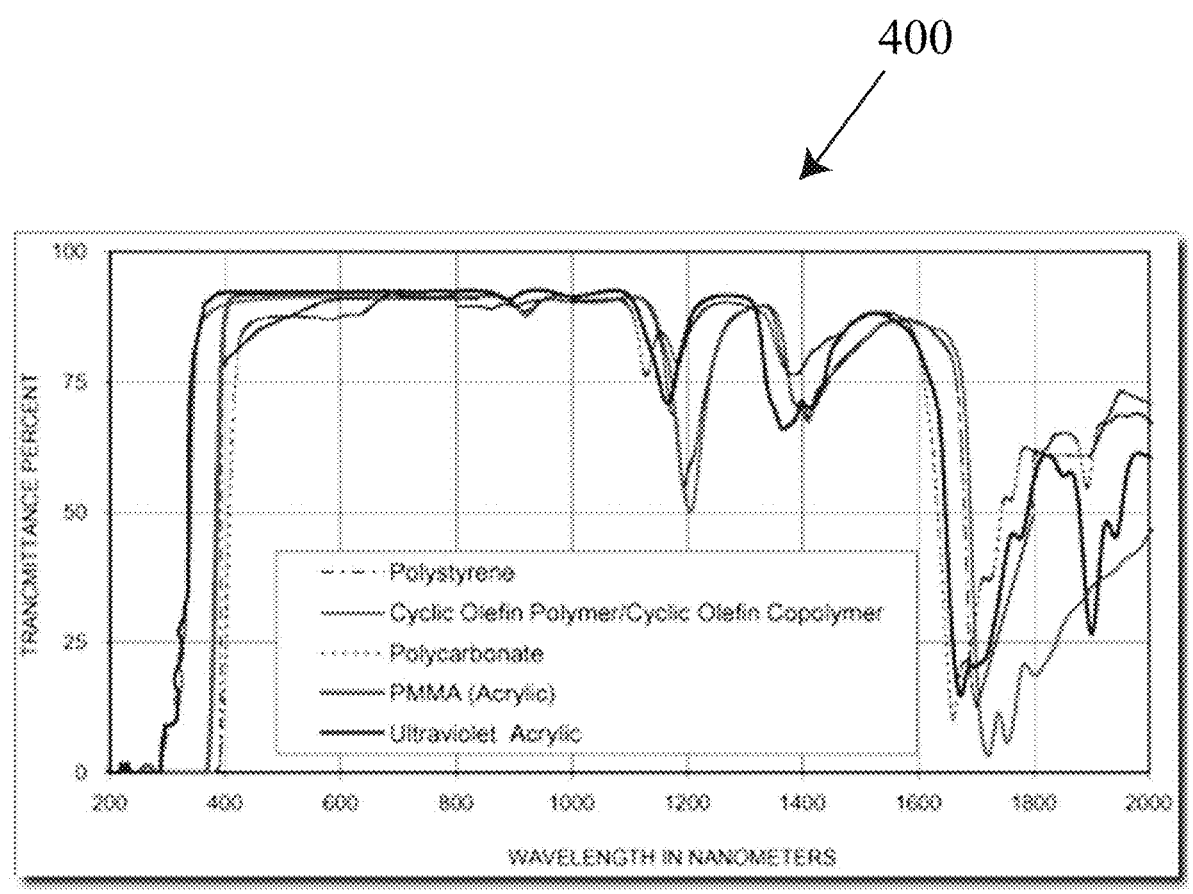
FIG. 4 is a plot illustrating an exemplary spectra measurement of an acrylic plastic target.

According to some embodiments, a parameter of the laser beam that is adjusted to generate plasma 314 is wavelength. The wavelength can be selected based upon transmission within a target material. FIG. 4 is a graph 400 showing transmittance percent as a function of wavelength for polymers. Examples of polymers can include Polystyrene [PS], Cyclic Olefin Polymer [COP], Cyclic Olefin Copolymer [COC], Polycarbonate [PC], Acrylic [poly(methyl methacrylate); PMMA], and Ultraviolet Acrylic (e.g., acrylic that is transmissive to ultraviolet light). The polymers shown in FIG. 4 are all generally transmissive within the wavelength range of visible light (e.g., about 380 nm to about 740 nm). PMMA, COC, COP, and PC are materials that are commonly used to fabricate microfluidic devices. According to some embodiments, the wavelength of the laser beam is selected to be generally transmissive in the transparent material.

According to some embodiments, a parameter of the laser beam adjusted to generate the plasma 314 is pulse duration. Pulse duration may be selected based upon the desired timescale of energy deposition, mode of plasma generation (e.g., LITB or LIOB), or rate of heat transfer within the transparent material. Pulse duration of a laser beam can affect thermal effects within the transparent material.

For example, in some embodiments pulse durations within the femtosecond range, having focused intensities of about $10^{14}$ W/cm$^2$, may result in complete (atomic) ionization producing a hot plasma of approximately solid density. In this timescale, substantially no heat may be transferred to the surrounding material lattice.

In other embodiments, pulse durations in a picosecond (ps) range (e.g., about 0.1 ps to about 100 ps) having a focused intensity of about $10^{12}$ W/cm$^2$ may result in generation of an ionic plasma. In this timescale substantially no thermal melting occurs (e.g., a heat affected zone having a thickness less than 100 nm).

In an further embodiment, pulse durations in a nanosecond (ns) range (e.g., about 0.1 ns to about 100 ns) having a focused intensity of about $10^{10}$ W/cm$^2$ can be below the threshold for avalanche ionization (except in the case of thermionic plasma formation). In this timescale, a >10 ns pulse duration can be long enough to allow heat to diffuse out of the focal region (during irradiation).

Figure 5:
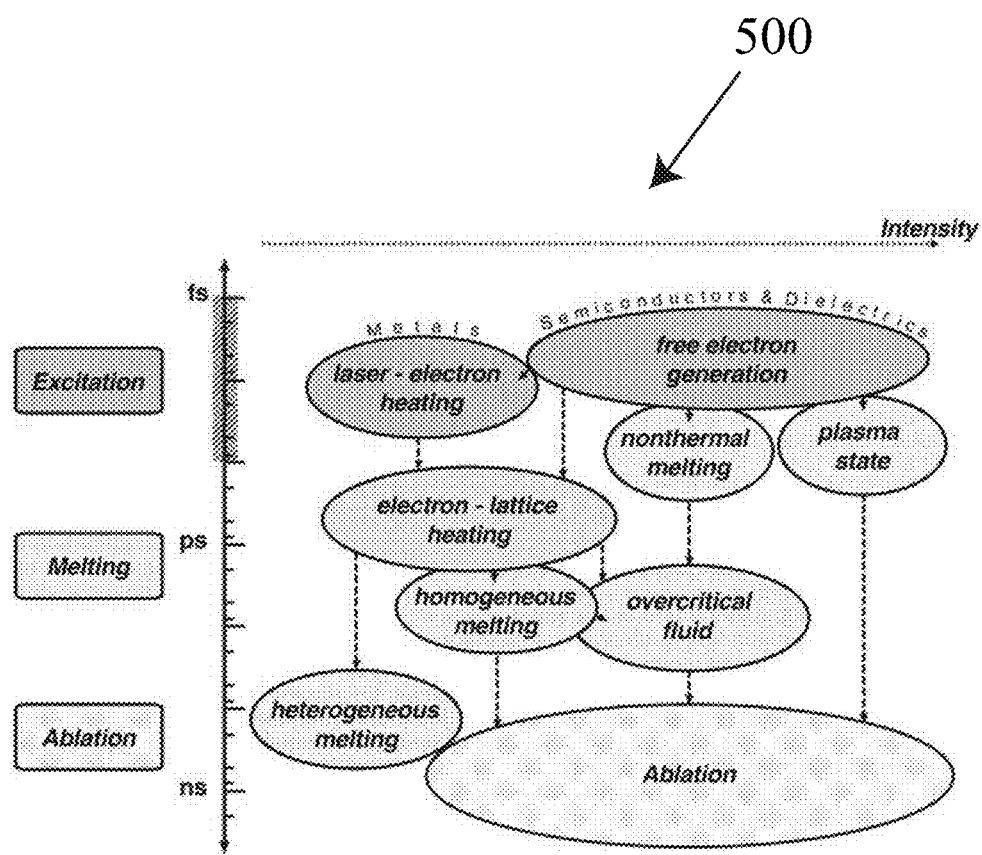
FIG. 5 is a plot illustrating timescale and laser focal region intensity for various phenomena associated with energy deposition in a material, according to some embodiments.

From the foregoing, it can be understood that shorter pulse durations can be desirable to achieve cleaner ablation with fewer thermal effects. However, shorter pulse durations typically require more expensive and technologically intensive laser sources to produce. FIG. 5 illustrates a chart 500 that indicates typical timescales and intensity ranges for phenomena after irradiation of a solid with a pulsed laser of 100 fs pulse duration.

Thermionic plasma is formed using thermally emitted electrons (thermions). Thermal emission of electrons (i.e., Edison Effect) occurs when a heated material emits electrons. The current density resulting from thermionic emission can be approximated in metals using Richardson's Law:

$$J = A_G T^2 e^{\frac{-W}{kT}}$$

where, J is the current density, $A_G$ is a generalized coefficient, T is temperature of the metal, W is the work function of the metal, and k is the Boltzmann constant ($1.38064852 \times 10^{-23}$ m$^2$ kg s$^{-2}$ K$^{-1}$).

Heating of the material typically occurs during the laser pulse at a rate determined by the absorbance of the material. For materials that are relatively more absorbing, it is possible to achieve thermionic plasma at focal region intensities that are smaller (e.g., less than $10^{10}$ W/cm$^2$) and pulse durations that are longer (e.g., longer than 10 ns) than those required for optical breakdown. According to some embodiments, longer pulse durations (e.g., at least 10 ns) are employed to generate a thermionic plasma in an otherwise transparent material, which has been doped with a chromophore for the laser beam wavelength.

According to some embodiments, a laser source and optical components are selected to ultimately produce an inclusion having a desired transverse width or transverse height. In one aspect, a waist size of the focused laser beam within a target material can be related to a target inclusion width size. For example, an inclusion width size may be approximately proportional to the waist diameter of the focused laser beam, $2\omega_0$ Width $\propto \sim 2\omega_0$ and, an idealized waist size may be estimated according to:

$$2\omega_o = \frac{4M^2 \lambda f}{\pi D}$$

where $M^2$ is a measure of beam quality, $\lambda$ is wavelength, f is focal length, and D is diameter of the laser beam at the focus optic (e.g., 216). According to some embodiments, the laser source is selected to have an $M^2$ of 2 or less, such that beam quality is high and resulting inclusions are narrow and/or uniform.

Likewise, in some versions, a Rayleigh range of the focused laser beam within a target material is generally related to a target inclusion height size. For example, in some versions an inclusion height may be approximately proportional to the Rayleigh range of the focused laser beam, $2Z_R$:

Height $\propto \sim 2Z_R$ and, an idealized Rayleigh length, $Z_R$, may be estimated according to:

$$Z_R = \frac{\pi \omega_0^2}{\lambda}$$

where $M^2$ is a measure of beam quality, $\lambda$ is wavelength, and $\omega_0$ is a half width of the focused laser beam waist at focus.

Therefore, a transverse shape (e.g., ellipticity, aspect ratio, height and width, etc.) of the inclusion formed within the transparent material may be controlled by adjusting waist diameter, $2\omega_0$ of the focused laser beam. In turn the waist diameter may be controlled through selection of laser beam diameter, D, and focus optic focal length, f. Said another way, a numerical aperture (NA) of a focusing system may be selected to control focused waist size and therefore inclusion shape. NA is:

$$NA = n * \sin\left[\arctan\left(\frac{D}{2f}\right)\right]$$

where, n is index of refraction of a surrounding material (e.g., the transparent material), D is a diameter of the laser beam incident the focus optic, and f is a focal length of the focus optic 216.

According to some embodiments, pulse energy can affect inclusion size. For example, inclusion formation may occur only where a laser intensity achieves a value greater than an inclusion formation threshold intensity. For example, inclusion formation may occur only where local intensity, I(r), exceeds a minimum inclusion forming threshold, $I_{threshold}$. The laser beam can have a bell-shaped intensity profile at the focal region (assuming a Gaussian energy profile). In this case, the energy profile can have the equation of:

$$I(r) = I_0 e^{\frac{-2r^2}{\omega^2}}$$

where, I(r) is local intensity of the laser beam at the focal region r distance away from the optical axis, $I_0$ is maximum local intensity of the laser beam at the focal region along the optical axis, $\omega$ is half width of the focal region (e.g., as defined by $1/e^2$ beam width measurements). A proportion of inclusion width to focal region width, $$\frac{r}{\omega},$$

may be estimated according to:

$$\frac{r}{\omega} = \sqrt{\frac{\ln\left(\frac{I_{threshold}}{I_0}\right)}{-2}}$$

The proportion of the focal region width, which is formed into an inclusion, is therefore related to the relationship between the maximum local intensity, $I_0$, and the threshold intensity, $I_{threshold}$. The maximum local intensity may be controlled according by pulse energy, E. Again assuming a Gaussian beam profile, the relationship between maximum local intensity and pulse energy can be understood as:

$$I_0 = \frac{2E}{\pi \omega^2}$$

Figure 6:
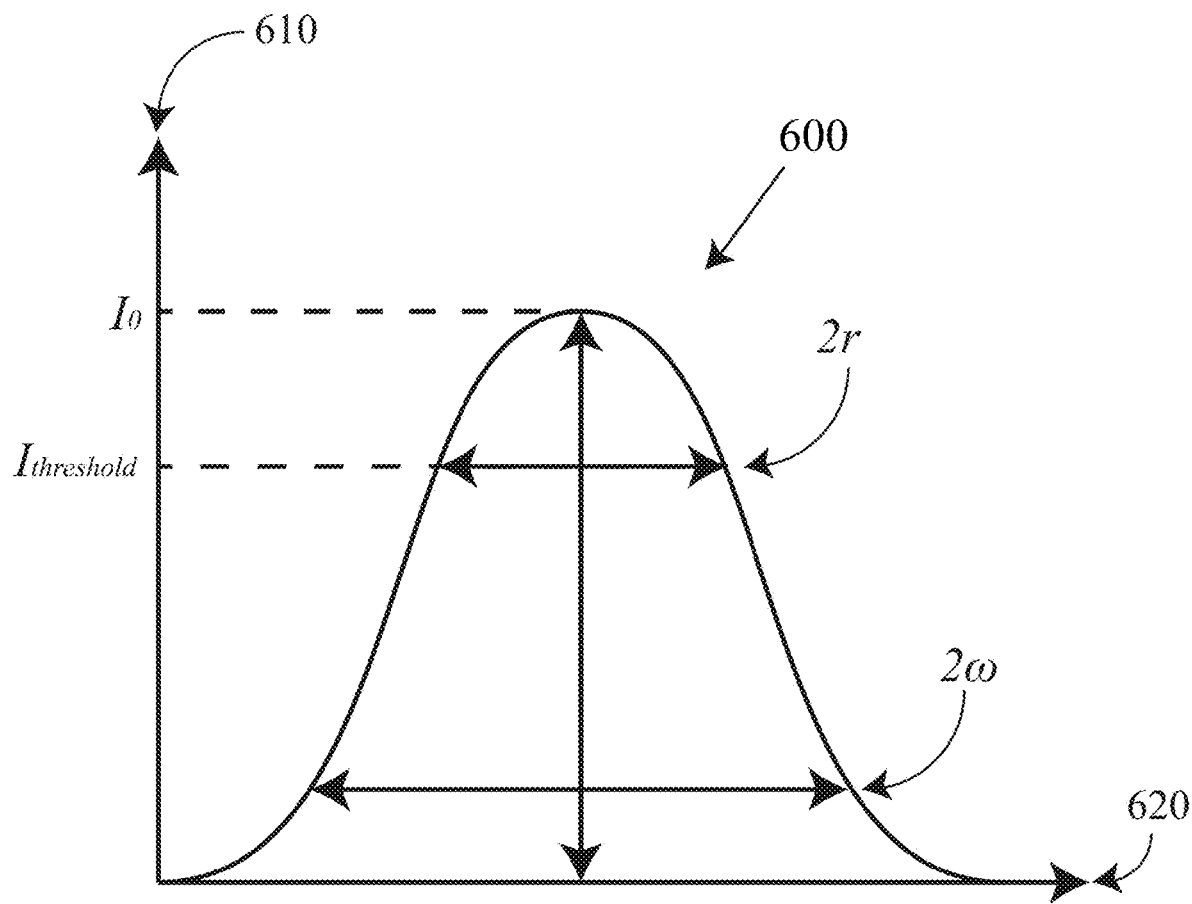
FIG. 6 is a plot schematically illustrating beam intensity profile at a focal region, with comparison to a resulting void width, according to some embodiments.

FIG. 6 illustrates a beam intensity profile 600, in a graph. The graph plots intensity (e.g., in W/cm²) along a vertical axis 610 and distance (e.g., in μm) along a horizontal axis 620. The beam intensity profile 600 has a value of at least the threshold intensity, $I_{threshold}$, over an inclusion width, 2r. The beam intensity profile 600 also has a maximum intensity, $I_0$, at the center and a width, $2\omega$, that is greater than the inclusion width.

According to some embodiments, the laser beam is pulsed and has a repetition rate. The repetition rate may be controlled to affect plasma generation and inclusion formation. In scanned embodiments, where the laser beam is scanned, repetition rate and scan rate may be controlled in concert to affect plasma generation and/or inclusion formation.

Figure 7:
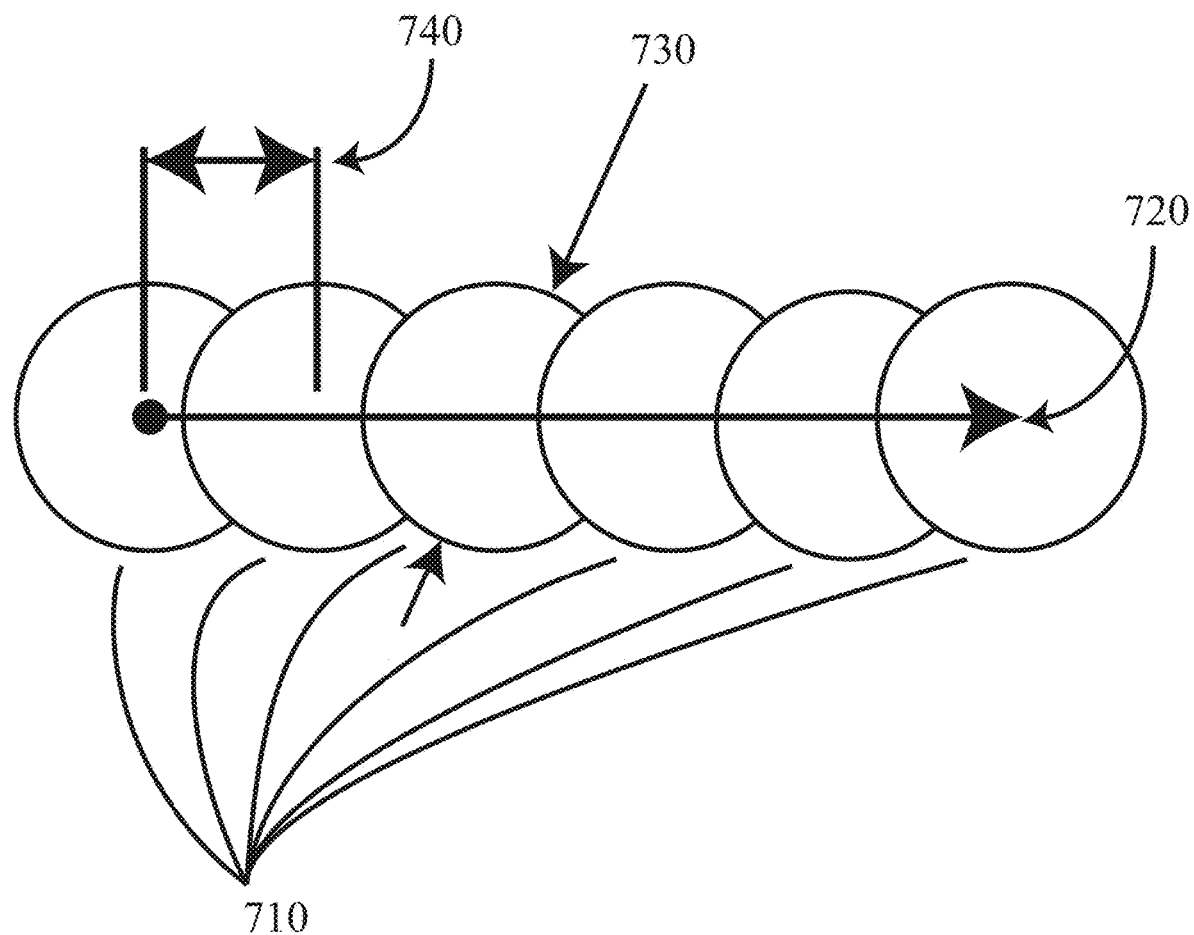
FIG. 7 schematically shows a series of focal regions as a laser beam is scanned along a path, according to some embodiments.

Referring now to FIG. 7, a series of focal regions 710 are shown along a scan path 720. Each focal region 710 has a width 730. A distance (or pitch) 740 between adjacent (or sequential) pulses is also shown. In some embodiments temporally sequential pulses are adjacent. In this case, the pitch 740 is given by:

$$\delta = \frac{V_{scan}}{f}$$

where, δ is the pitch 740, for example in mm; $V_{scan}$ is the scan rate, for example in mm/s; and f is the repetition rate, for example in Hz.

According to some embodiments, numerous pulses in a single location may be needed to form a plasma or an inclusion. For this reason, it is appropriate in some embodiments (e.g., inclusion formation in Polycarbonate), to model accumulated intensity (e.g., fluence). Accumulated fluence may be modeled according to:

$$N = \frac{2\omega_0 + PD * f}{\delta}$$

$$I_{ACC} = N * I$$

where, PD is pulse duration of the laser beam pulse; N is the number of pulses irradiating any given point along the scan path 720; $I_{acc}$ is accumulated intensity (e.g., accumulate fluence); and, I is intensity (e.g., fluence).

The above disclosure anticipates effects of adjustment of some parameters, a table is presented below that describes typical parameter ranges for some embodiments.

|  | Min. | Nom. | Max. |
|---|---|---|---|
| Numerical Aperture | 0.01 | 0.5 | 1 |
| Wavelength (nm) | 200 | 1060 | 20,000 |
| Rep. Rate (Hz) | 10 | 10,000 | 200,000 |
| Pulse Duration (ns) | $1 \times 10^{-6}$ | 100 | $1 \times 10^5$ |
| $M^2$ | 1 | 1.5 | 3 |
| Focused Spot Sized Spot Size (µm) | 0.01 | 3 | 1000 |
| Rayleigh Range (µm) | 0.01 | 30 | $1 \times 10^8$ |
| Material | Materials that a generally transparent in a range of EMR (e.g., visible range, UV range, and/or near IR range), for example: Thermoplastics, such as PMMA, HEMA, and polycarbonate; other polymers; glass; and crystal (e.g., quartz). | | |
| Concentration | A concentration of at least as great as one dopant particle per focal volume, for example in a range of between 0.00001 mg/ml and 10 g/ml | | |
| LITB Dopant | Materials being generally absorbing at an EMR wavelength, for example: carbon, melanin, absorbing pigments and dyes (e.g., India ink), metal nanoparticles, and dendritic molecules. A 2-step dopant, such as photosensitive material (e.g. silver particles) | | |
| LIOB Dopant | Materials containing an element having a low ionization energy, such as: Sodium, Potassium, and many non-metals; low band gap dielectrics such as: Aluminum gallium arsenide, Zinc oxide doped with aluminum, indium or gallium, and Gallium phosphate; materials with a low local work function, such as: nanoparticles having a surface area lowering the local work function of the material below that of a bulk work function. A 2-step dopant, such as photosensitive material (e.g. silver particles). | | |

Example embodiments are provided below in order to illustrate applications (e.g., direct write microfluidic channels) and performance of laser processing in doped transparent materials.

Laser Direct Write Microfluidic Channel Application

Doping-based selective plasma generation can be used for producing subsurface fluidic channels in a monolithic target material. This can be done, for example, by using a laser beam focused with high NA optics to produce a focal region (e.g., diffraction limited focal region) in the monolithic target material (e.g., acrylic). Dopants can be added to a subsurface region of the monolithic target material (e.g., a predetermined shape) where a fluidic channel needs to be etched. According to some embodiments, dopant can be uniformly added to the entire monolithic block. The focused laser beam can be scanned (e.g., scanned along x, y and z axes) through the volume of the monolithic target material (e.g. using optical system 100) that includes the doped subsurface region. For example, the focused laser beam 106 can be scanned along a plane parallel to a surface of the target material (e.g., x-y plane) and along the depth of the target material (e.g., z-axis). In some implementations, the optical system for subsurface fluidic channel generation can include an interferometric system that can ensure that the focused laser beam 106 and the monolithic target material are accurately aligned (e.g., by aligning the optical system with respect to a surface of the monolithic target material).

Generation of subsurface microfluidic channels by doping a monolithic target material has several advantages over microfluidic channels generated from etching surfaces of two or more slabs of materials (e.g., by micromachining, laser machining, embossing, and the like) followed by bonding the two or more slabs of materials. Imperfections in the slab surfaces can make bonding extremely difficult and can lead to a high defect rate. Direct write laser microfluidic channel formation can allow for fabrication of microfluidic channels without the need to bond multiple layers.

Figure 8:
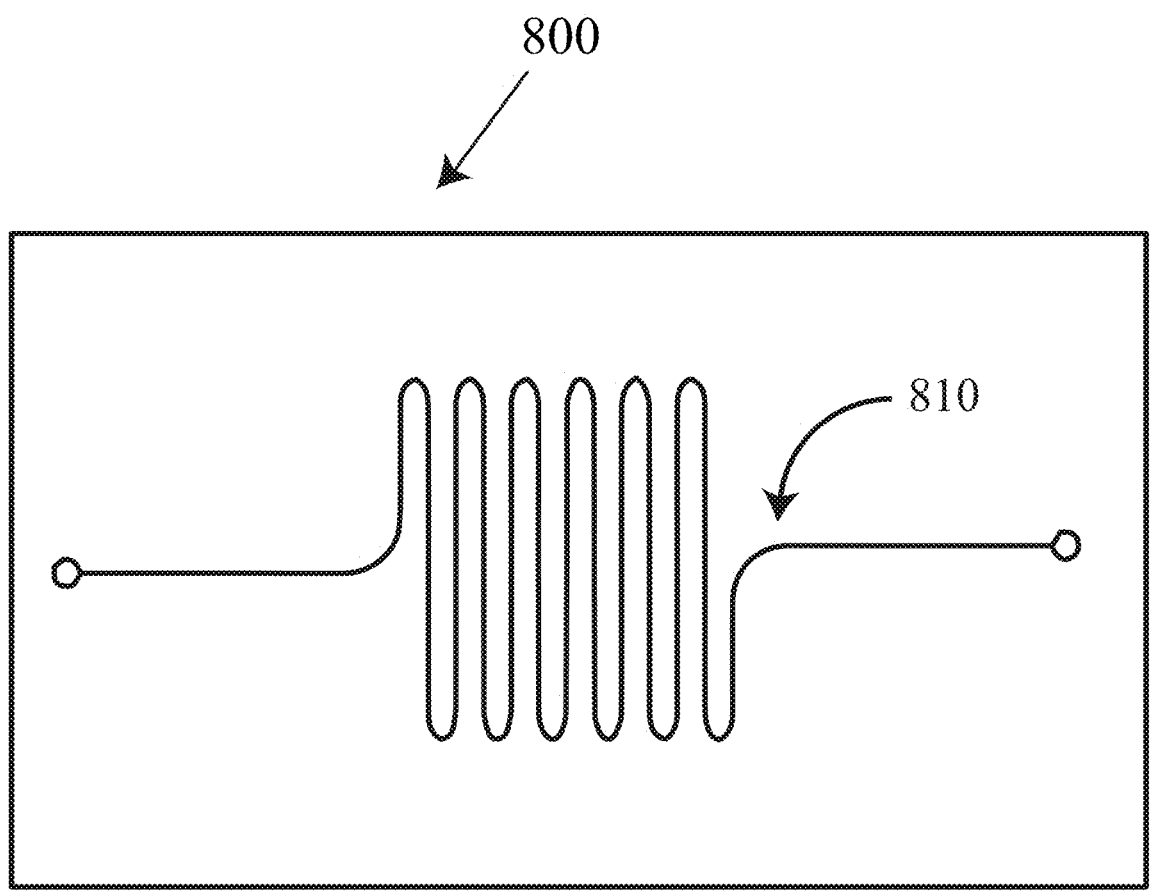
FIG. 8 is a top view of a schematic of an exemplary microfluidic channel, according to some embodiments.
Figure 9:
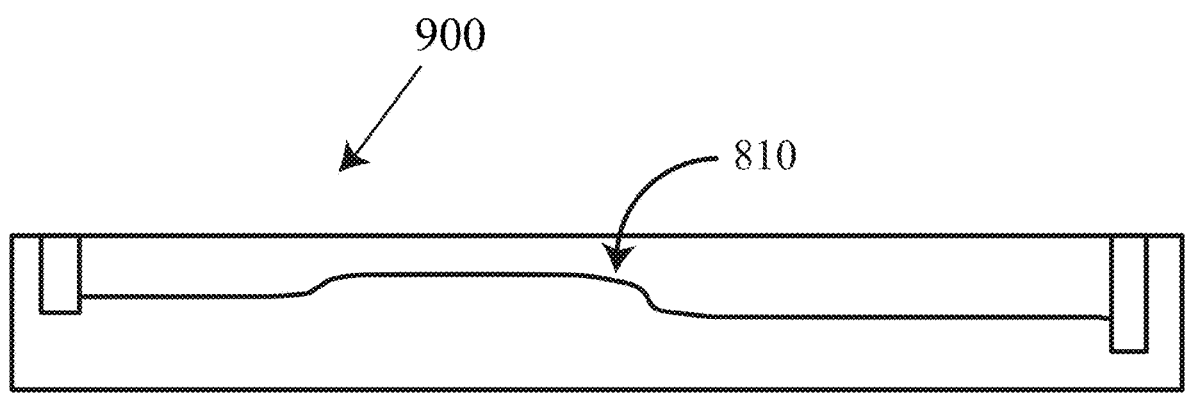
FIG. 9 is a side view of a schematic of an exemplary microfluidic channel, according to some embodiments.

Presently, because of the current manufacturing processes, microfluidic channels are limited to 2-Dimensions (2D). Subsurface microfluidic channels generated through laser processing, however, are not limited in this way. Referring now to FIG. 8, a top (i.e. X-Y) view 800 of a microfluidic channel 810 according to some embodiments is schematically shown. From the top view 800, the microfluidic channel 810 appears similar to conventional microfluidic channels. However, the microfluidic channel 810 as it appears in a side (i.e. X-Z) view 900, shown in FIG. 9, is unlike those channels produced by current methods. The microfluidic channel 810 from the side view 900 can be seen to have a depth (i.e. extending in the Z direction) which changes with location.

As discussed above, efforts have been made to produce microfluidic channels directly in an un-doped transparent material by researchers at The School of Mechanical and Manufacturing Engineering of Dublin City University in Dublin, Ireland. These efforts are well documented in Aymen Ben Azouz's dissertation entitled "Microfluidic Device Prototyping via Laser Processing of Glass and Polymer Materials," incorporated herein by reference. Azouz presents subsurface laser formed channels in polycarbonate (PC), with mixed results. Channel formation attempts in PC using parameters similar to those described by Azouz are described below:

Channels were first formed in un-doped PC using a Nufern NuQ® fiber laser (Nufern of East Granby, Conn., U.S.A.). Microchannels were made at a depth of about 1 mm into a PC block through a 0.5 NA focused laser beam having a wavelength of 1060 nm, a pulse duration of about 100 ns, a repetition rate of about 30 kHz, and a pulse energy of about 0.02 mJ/pulse. The PC block is scanned during irradiation along a single axis at a rate of about 10 mm/s. Therefore, a pitch between adjacent spots is estimated at about 0.3 µm.

Figure 10A:
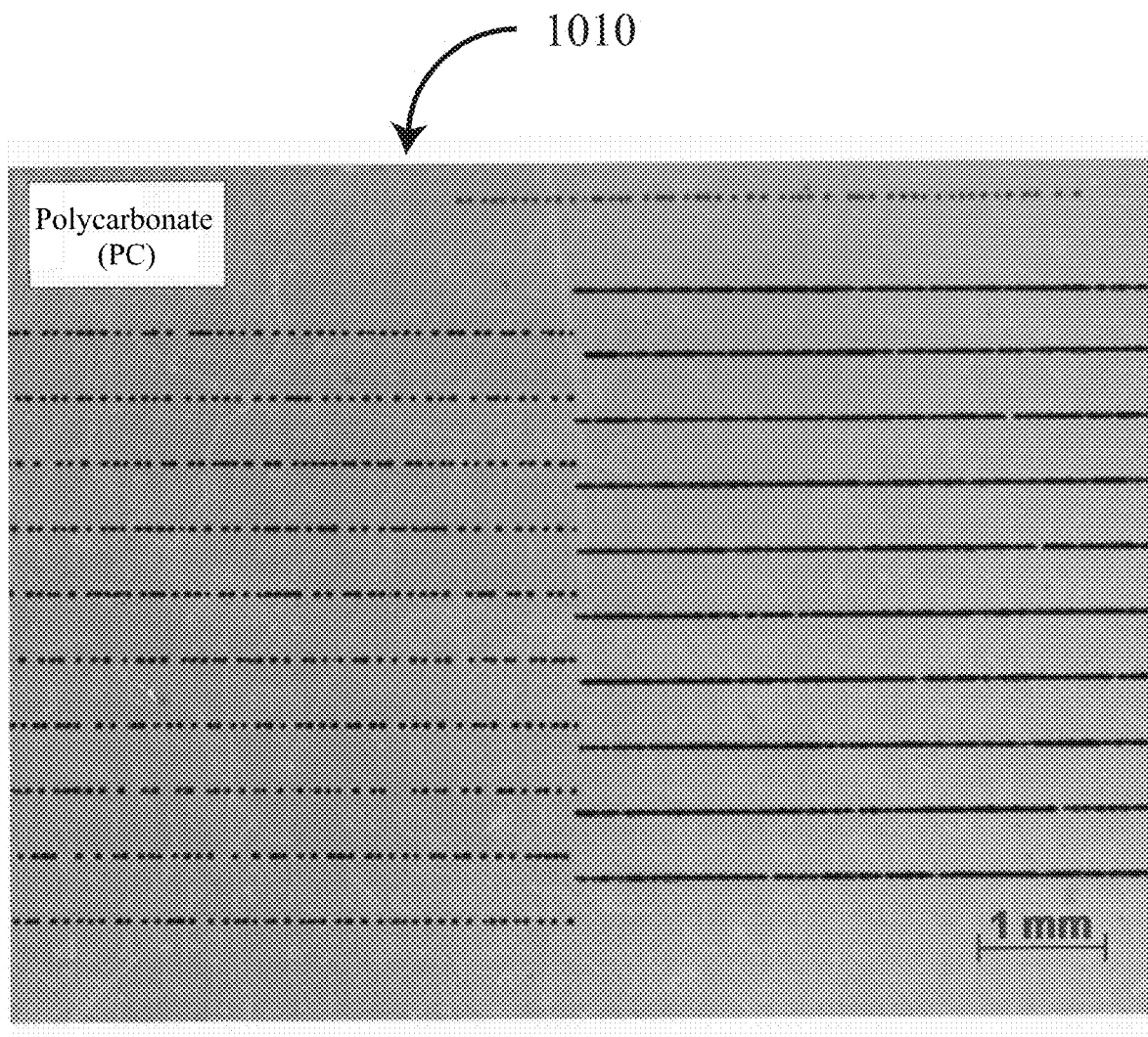
FIG. 10A is a microscope image of microchannels formed in polycarbonate, according to some embodiments.
Figure 10B:
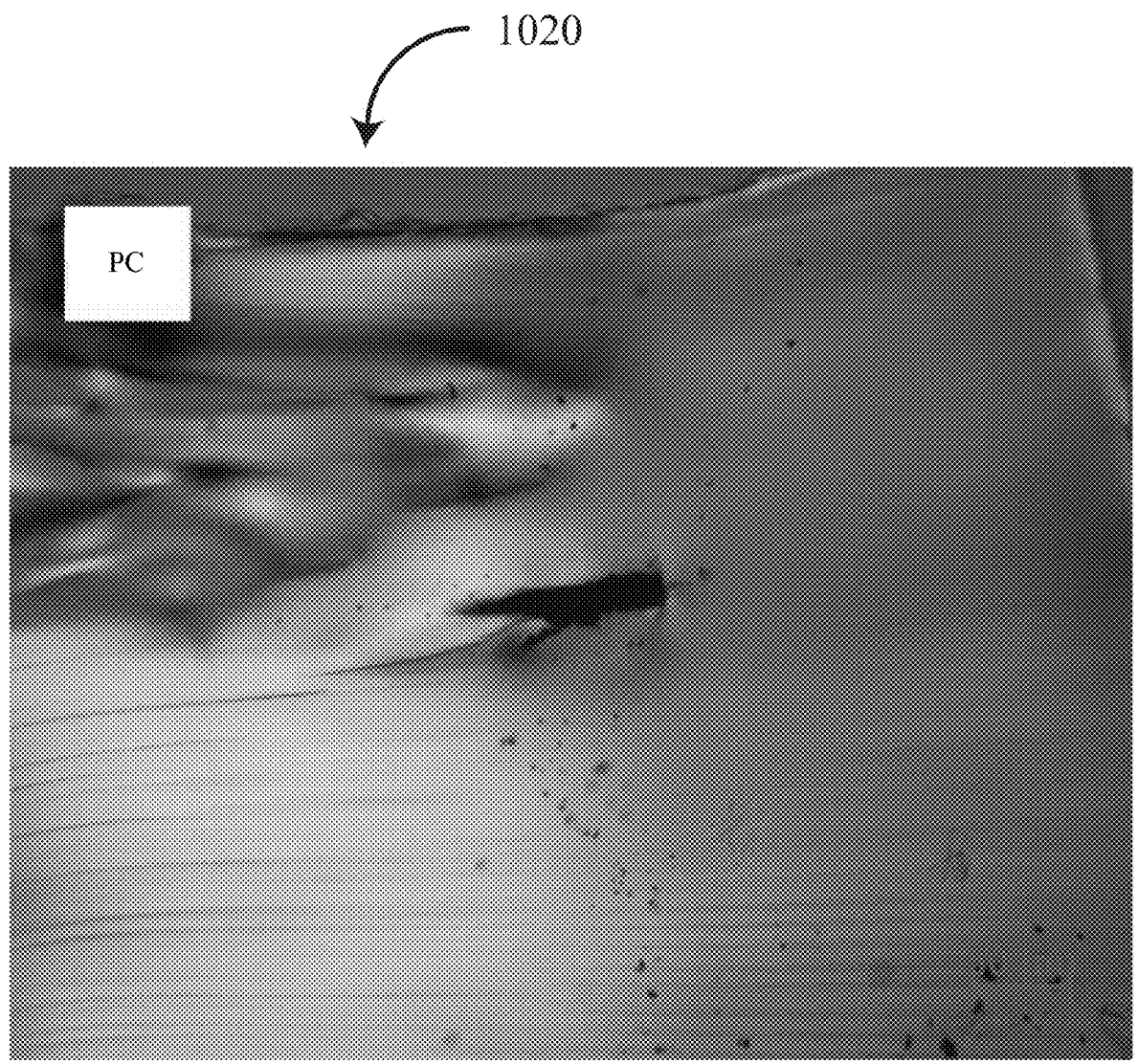
FIG. 10B is a microscope image of a cross-section of a microchannel formed in polycarbonate, according to some embodiments.

An image 1010 shows the microchannels at a lower magnification (e.g., 20×) is illustrated in FIG. 10A, and, a transverse image 1020 taken after cross-sectioning with a microtome is shown in FIG. 10B. It was found that these channels were at least partially occluded by carbonaceous char. Note that the carbonaceous char has higher electrical and thermal conductivity than the base PC material which may be used as an electrical or thermal path to produce an electrical or thermal structures and circuits.

A second attempt to form channels in undoped PC was performed using a Lumentum PicoBlade® laser from Lumentum Operations LLC of Milpitas, Calif., U.S.A. The laser was operated at 10 ps pulse width, pulse energy of 200 µJ, wavelength of 1064 nm, and between 500 and 1000 Hz. Microchannels were formed within a PC block at depths up to about 1 mm using a 0.3 NA focused laser beam. The PC block was scanned during irradiation along a single axis at a rate of about 10 mm/S. Therefore, a pitch between adjacent spots is estimated at between 0.02 mm and 0.04 mm.

Figure 11A:
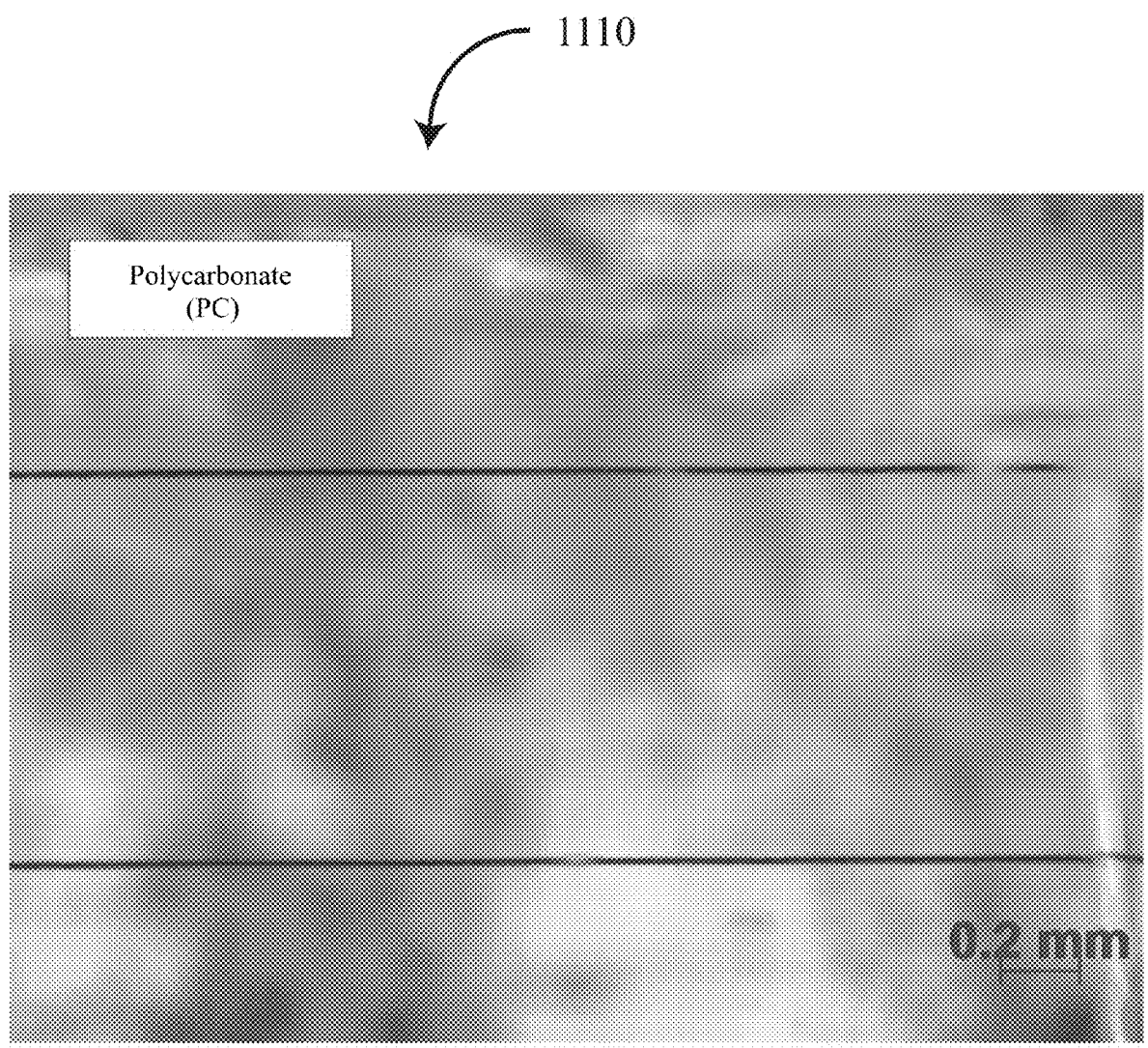
FIG. 11A is a microscope image of microchannels formed in polycarbonate, according to some embodiments.
Figure 11B:
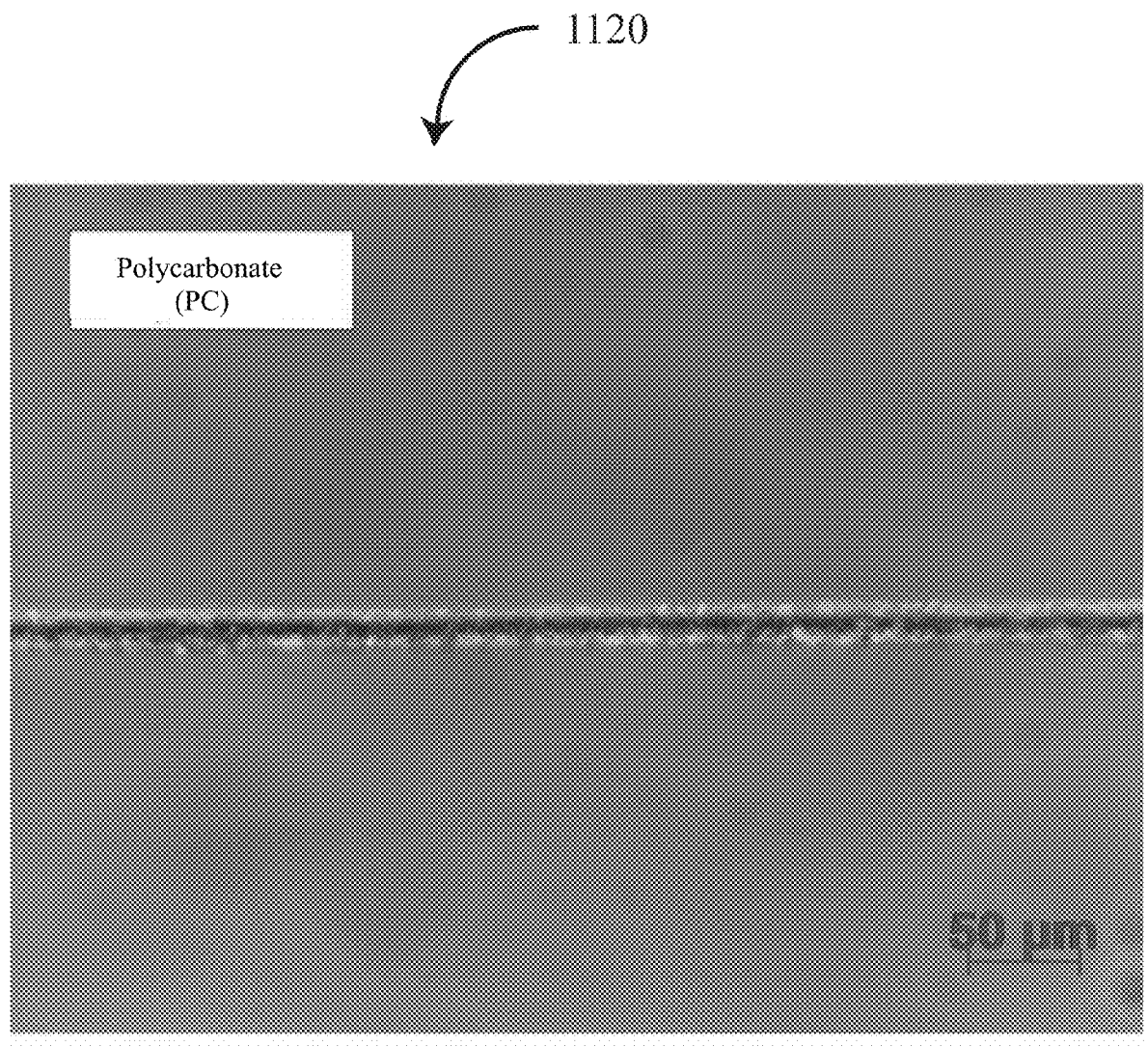
FIG. 11B is a microscope image of microchannels formed in polycarbonate, according to some embodiments.
Figure 11C:
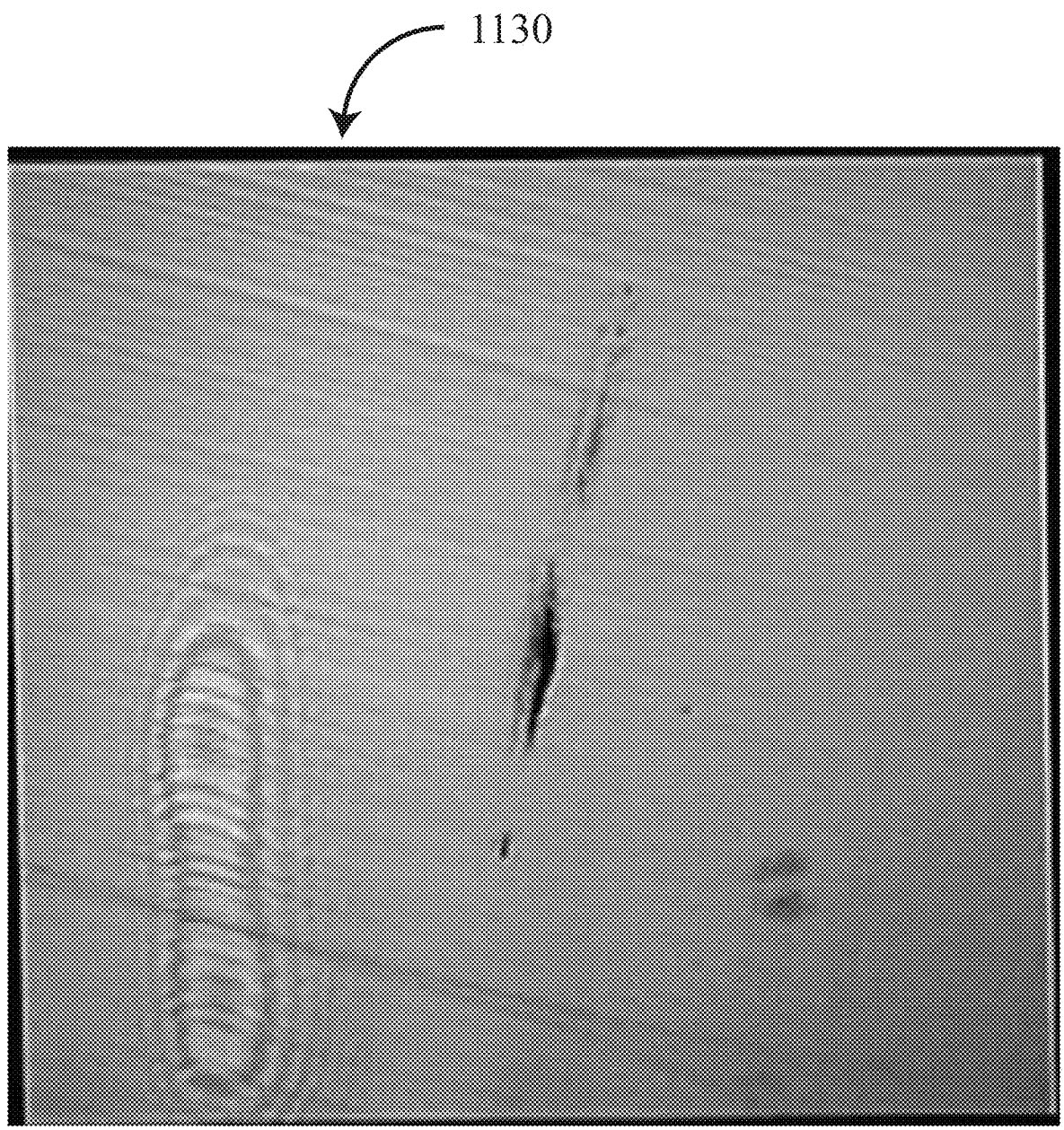
FIG. 11C is a microscope image of a cross-section of a microchannel formed in polycarbonate, according to some embodiments.

An image 1110 shows the microchannels at a lower magnification (e.g., 63×) is illustrated in FIG. 11A. A magnified image 1120 shows the microchannels at a higher magnification (e.g., 350×) is illustrated in FIG. 11B. A transverse image 1130 taken after cross-sectioning with a microtome is shown in FIG. 11C. As above, it was found that these channels were at least partially occluded by carbonaceous char. Again, the char may be used to produce an electrical or thermal structure and circuit.

The microchannels formed in un-doped polycarbonate are generally smooth and continuous however, the carbonaceous char may prevent free passage of fluids and light rendering such channels less than desirable for microfluidics applications. Additional tests on related polymers deemed suitable for microfluidic device manufacture are described below. For these tests, the Nufern NuQ® fiber laser, described in detail above, is used. The laser beam is focused into the polymers using an 8 mm EFL lens (Thorlabs Part No. C240TME-C) configured to focus the beam at about 0.5 NA.

Figure 12:
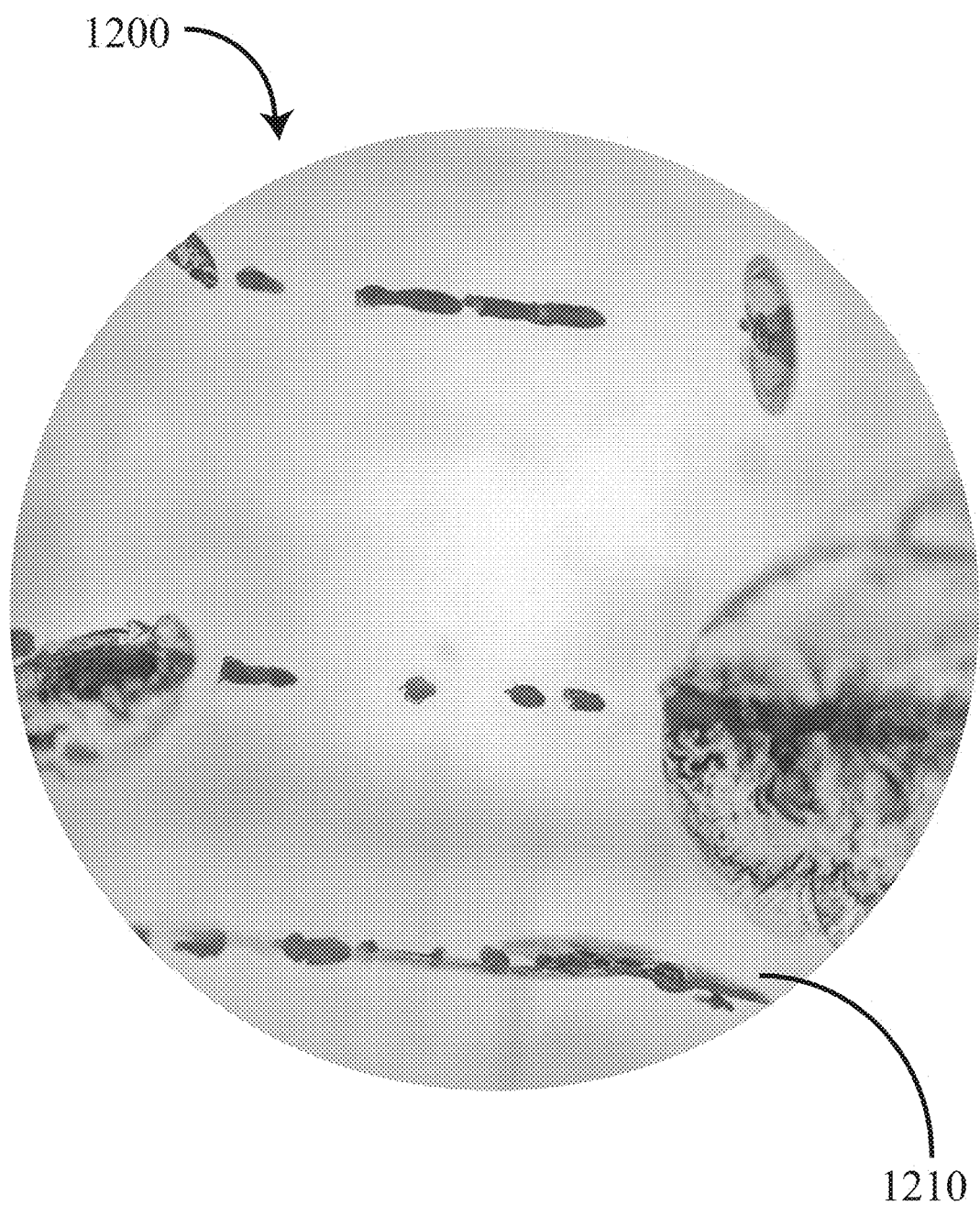
FIG. 12 is a microscope image of microchannels formed in polystyrene, according to some embodiments.

FIG. 12 shows a magnified image 1200 of non-continuous microchannels 1210 formed at a depth of about 2 mm within undoped polystyrene (PS). The channels 1210 are incomplete and cracking can be seen. Parameters associated with the non-continuous channels 1210 are 20 kHz repetition rate, 100 ns pulse duration, 0.5 mJ pulse energy, and a scan speed stepped within a range of 10 mm/s and 40 mm/s.

Figure 13:
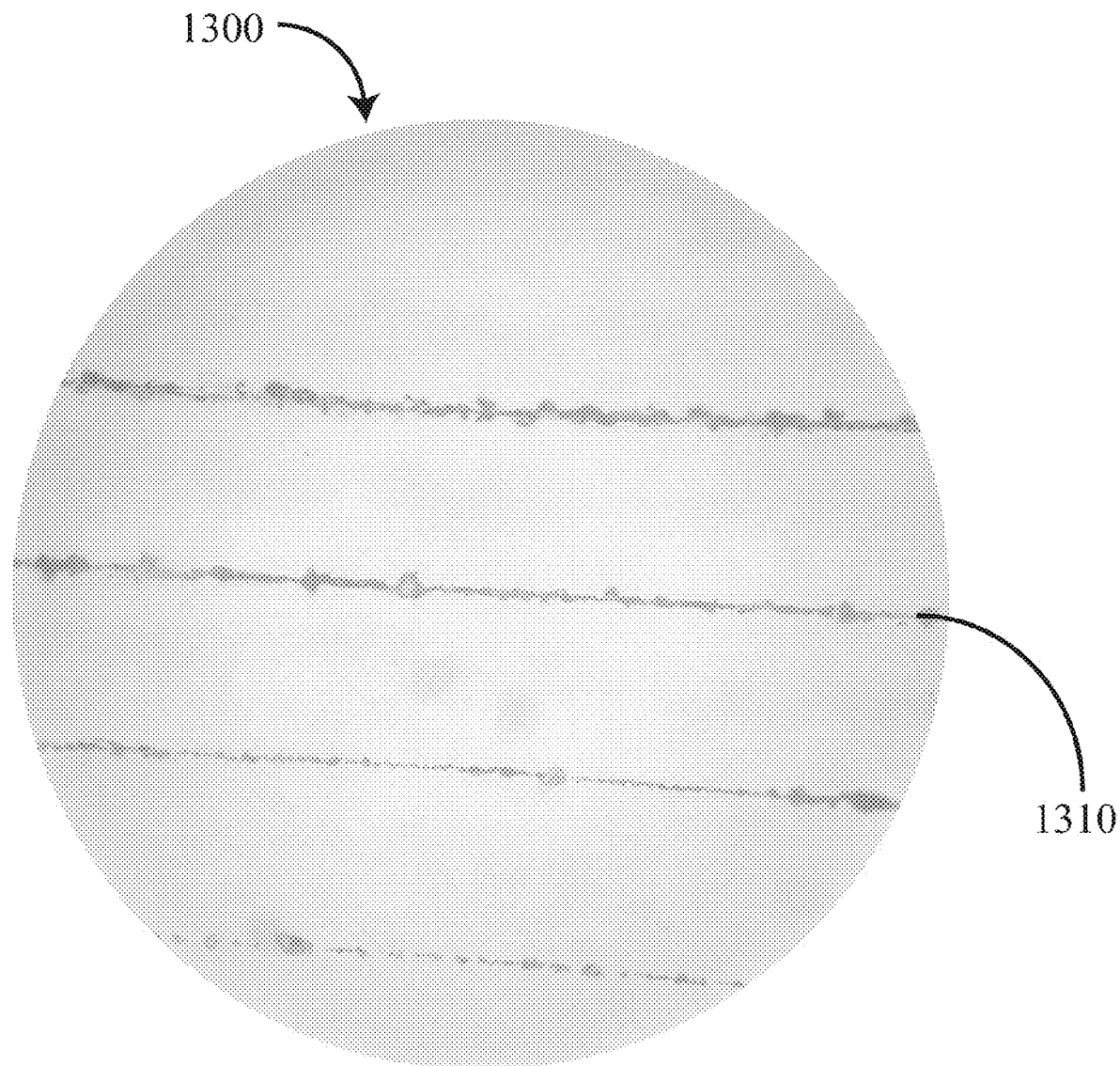
FIG. 13 is a microscope image of microchannels formed in fluorinated ethylene propylene, according to some embodiments.

FIG. 13 shows a magnified image 1300 of microchannels 1310 formed at a depth of about 2 mm within undoped Fluorinated Ethylene Propylene (FEP). The channels 1310 are continuously formed, however, microcracking can be seen. Parameters associated with the channels 1310 are 110 kHz repetition rate, 150 ns pulse duration, a pulse energy stepped in a range of 0.13 mJ and 0.5 mJ pulse, and 20 mm/s scan speed.

Figure 14:
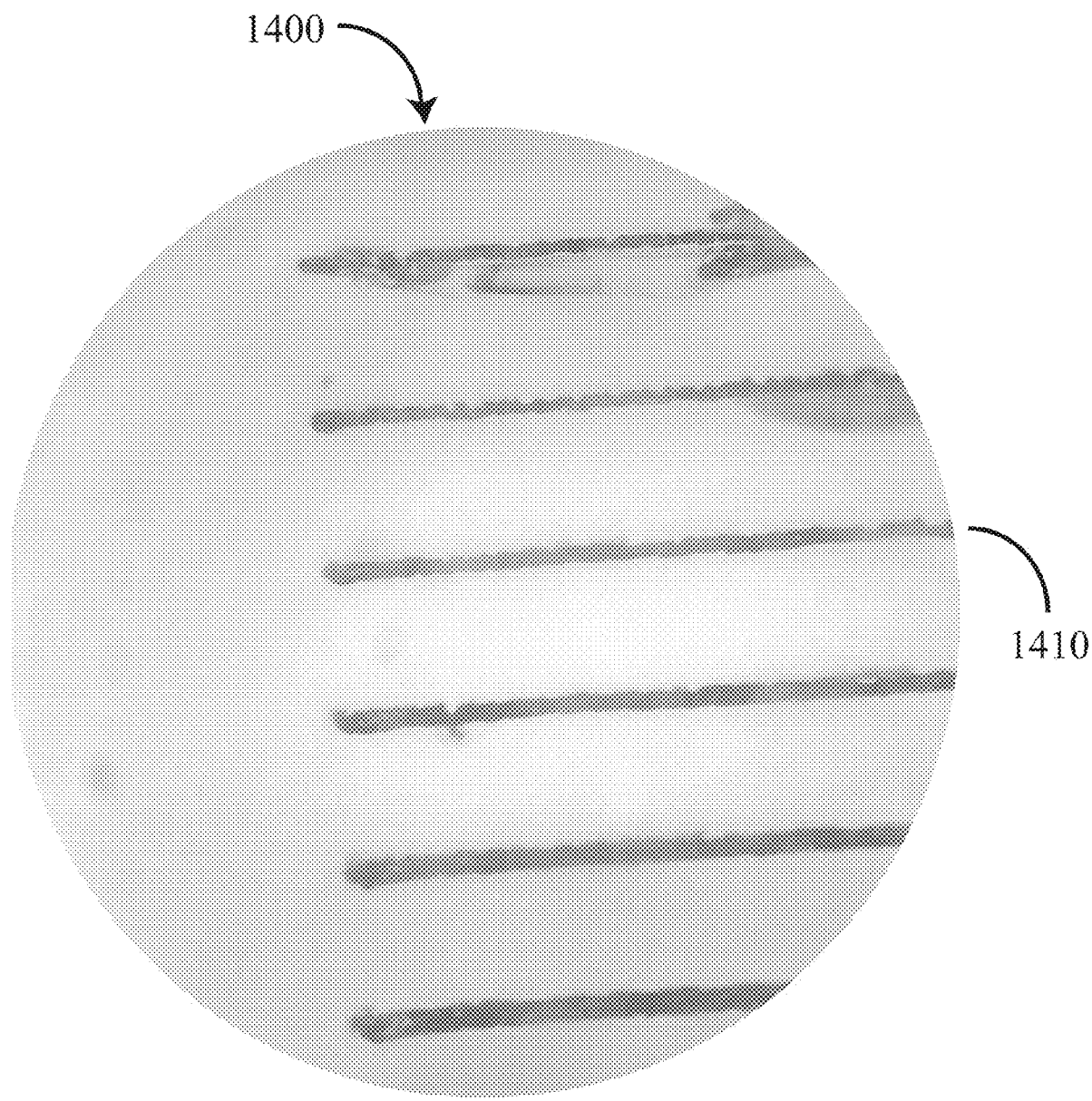
FIG. 14 is a microscope image of microchannels formed in polysulfone, according to some embodiments.

FIG. 14 shows a magnified image 1400 of microchannels 1410 formed at a depth of about 2 mm within undoped Polysulfone (PSU). The channels 1410 are continuously formed, however, thermal effects (e.g., microcracking) are also present. Parameters associated with the channels 1410 are 110 kHz repetition rate, 150 ns pulse duration, a pulse energy stepped in a range of 0.25 mJ and 0.5 mJ pulse, and 20 mm/s scan speed.

Figure 15A:
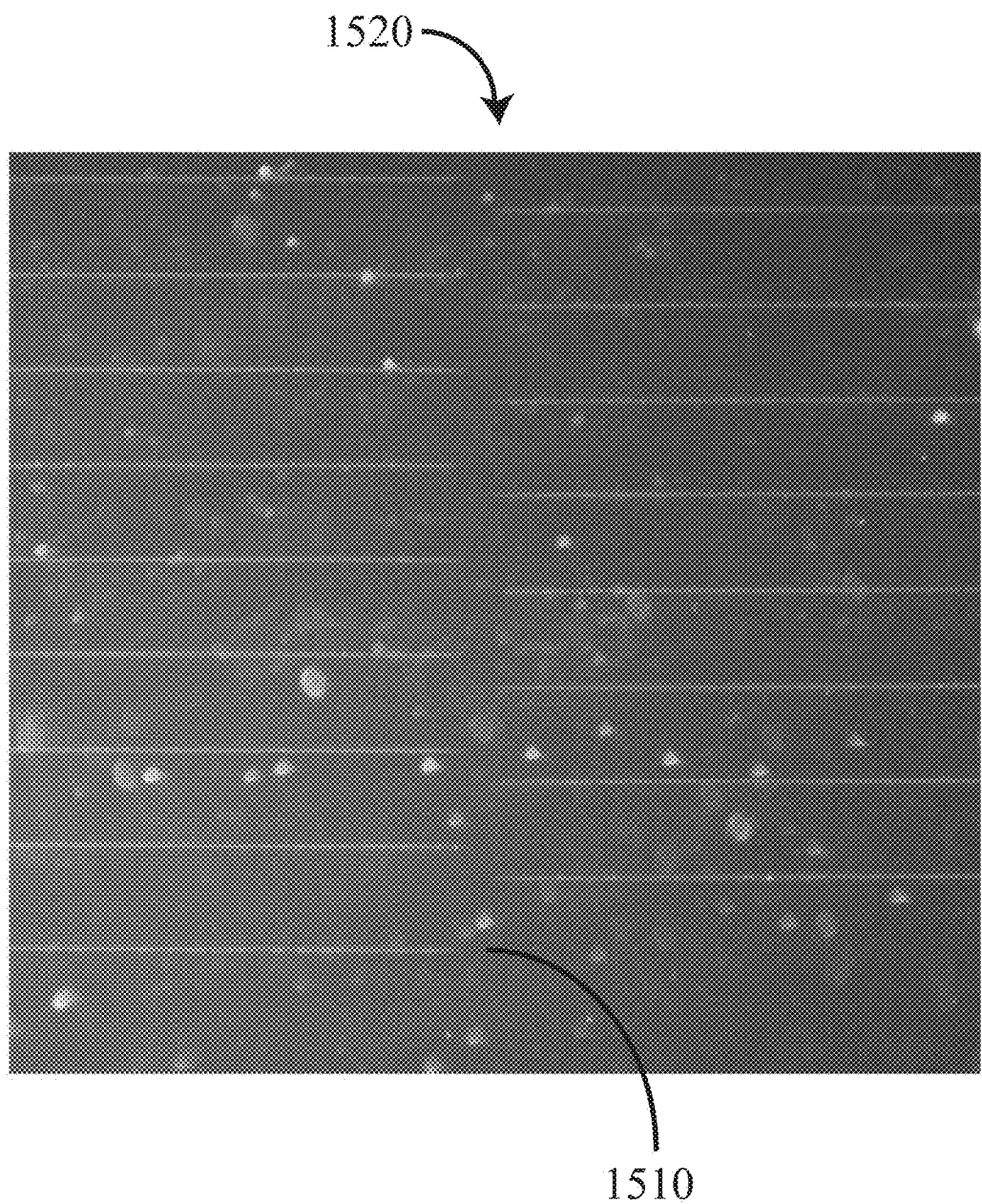
FIG. 15A is a low magnification microscope image of microchannels formed in acrylic, according to some embodiments.
Figure 15B:
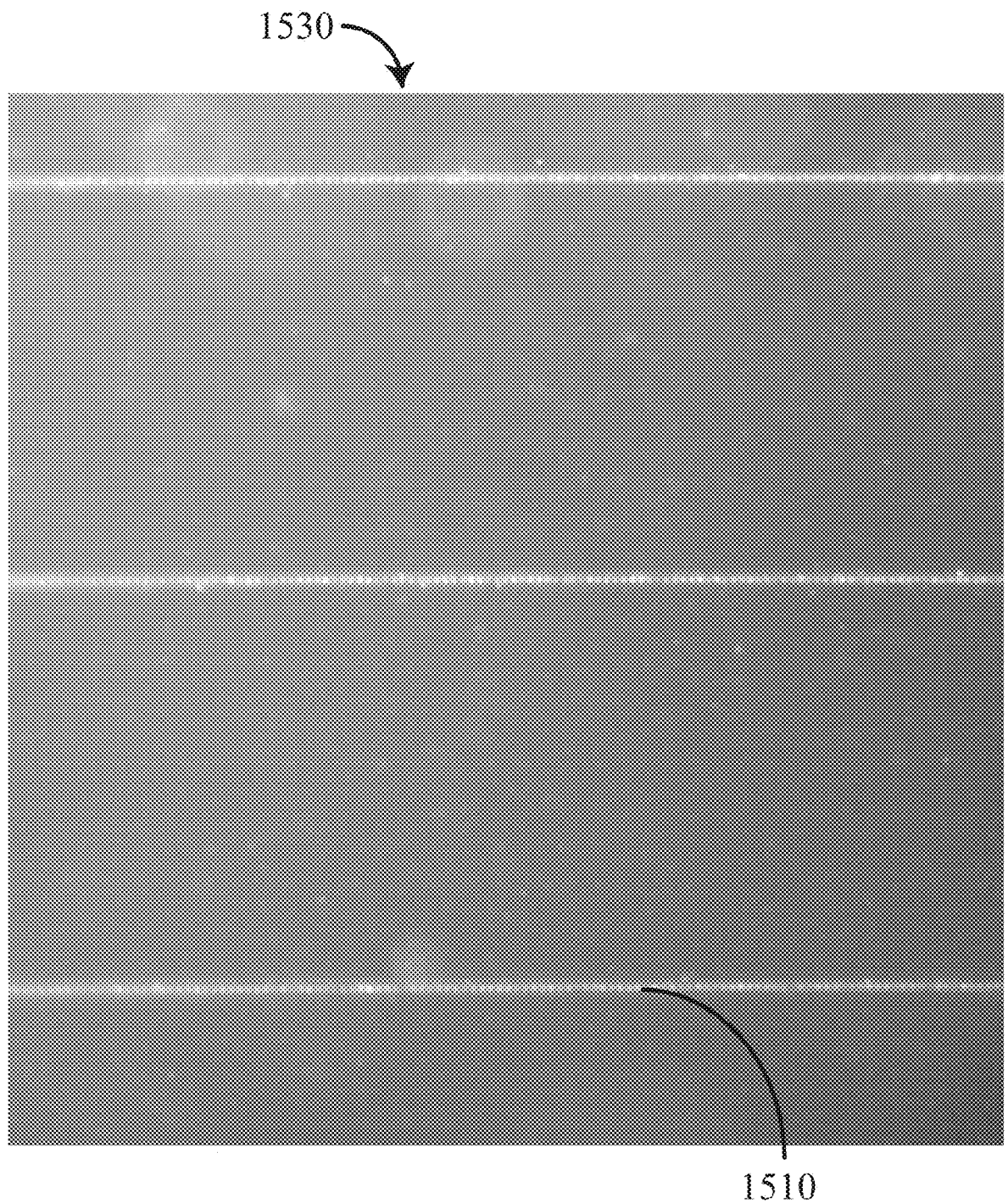
FIG. 15B is a high magnification microscope image of microchannels formed in acrylic, according to some embodiments.

FIGS. 15A-15B show magnified images of microchannels 1510 formed at a depth of about 1 mm in a tinted (e.g., doped) acrylic (PMMA) block (McMaster-Carr Part No. 8505K721:GRAY). Parameters associated with the channels 1410 are 20 kHz repetition rate, 100 ns pulse duration, a pulse energy of 0.1 mJ-0.05 mJ per pulse, and 200 mm/s scan speed Therefore a pitch between adjacent spots is estimated at about 0.01 mm. A low magnification image 1520 (FIG. 15A) shows the microchannels at a lower magnification. A high magnification image 1530 (FIG. 15B) shows the microchannels at a higher magnification.

The microfluidic channels 1510 shown in doped PMMA appear to exhibit significantly fewer thermal effects (e.g., carbonaceous species, microcracking, etc.) than those formed in undoped polymers (PC, PS, FEP, and PSU). Also, the microfluidic channels 1510 in doped PMMA were formed using generally less total energy. It is expected that this is because, the dopant increased absorption of the laser energy within the PMMA. Unfortunately, the dopant (i.e., having a gray tint) used in the doped PMMA blocks above, also decreases the transmissivity of the polymer at many wavelengths (e.g., visible spectrum).

U.S. patent application Ser. No. 10/591,289 titled "High-transparency laser-markable and laser-weldable plastic materials" to Hager et al., incorporated herein by reference, teaches a method of doping transparent polymers with nanoparticles to increase the polymer's absorbance at a specific narrowband for laser welding and marking, while not appreciably affecting transparency in a visible spectrum and may be employed in some embodiments of the present invention.

Figure 16:
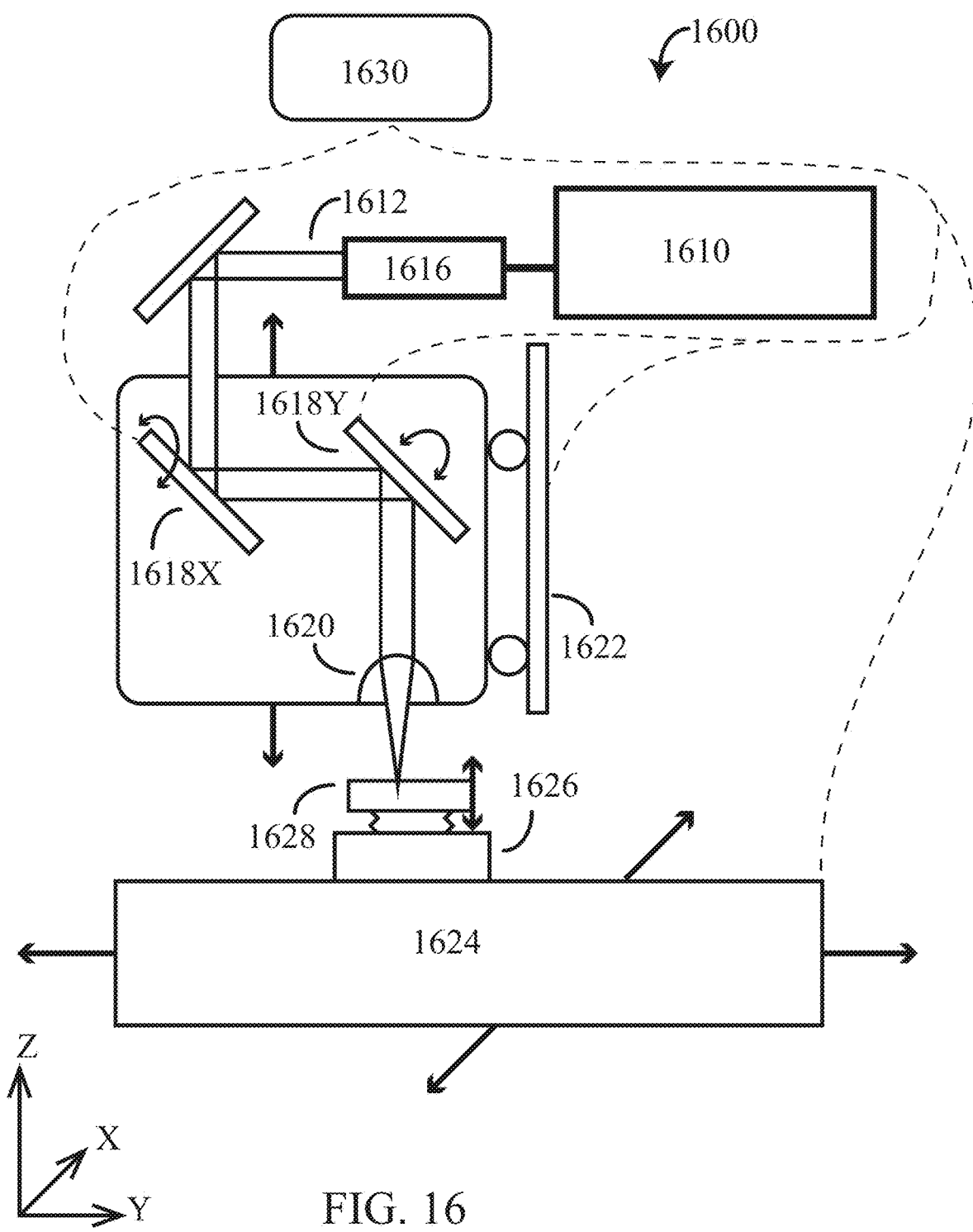
FIG. 16 is a schematic illustration of a system for forming microchannels within materials, according to some embodiments.

In order to better understand effects of dopant and pulse duration on microfluidic channel formation, additional tests are described below. FIG. 16 outlines a system 1600 used for microchannel formation for the tests. A laser source 1610 generates a laser beam 1612. The laser source is a Lumentum PicoBlade®, described in detail above. For the tests, the laser source delivers pulses having a constant 10 ps pulse duration and a constant 200 µJ pulse energy. The laser beam 1612, after exiting the laser source 1610, passes through a beam expander 1616. The beam expander 1616 expand the laser beam 1612 at a ratio of 8:1. After exiting the beam expander 1616, the laser beam 1612 has a width of about 10 mm and is directed to a pair of galvanometers 1618X-Y. Each of the galvanometers 1618X-Y is configured to tilt in a single axis, thereby introducing a tilt gradient to the laser beam 1612. The 622 X-galvanometer 1618X introduces a tilt gradient generally in an X-axis. The Y-galvanometer 1618Y introduces a tilt gradient generally in a Y-axis. According to some embodiments, the laser beam 1612 is steered using the galvanometers 1618X-Y and focused using an F-Theta lens (not shown), which is located down-beam of the galvanometers 1618X-Y. For the tests described however, a focus optic (e.g., objective lens) 1620 is placed down-beam of the galvanometers; and, the galvanometers were held static. For the tests, the focus optic 1620 is a 25 mm diameter aspherical lens, having a NA of 0.54, a focal length of 20 mm, a clear aperture of 22.5 mm, and an anti-reflective coating in a wavelength range of between 1050 nm and 1700 nm (e.g., Thorlabs Part No. AL2520M-C). A linear stage 1622 is configured to translate the galvanometers 1618X-Y and the objective lens 1620 linearly along a Z-axis, which is nominally in-plane with an optical axis of the focus optic 1620. Further down beam of the objective 1620 is a 2-axis translation stage 1624. The 2-axis translation stage is configured to provide translational movement along an X-axis and Y-axis. In some embodiments, one or more of the X-axis and the Y-axis are substantially perpendicular to the Z-axis. A sample holder 1626 is securely affixed to the 2-axis stage 1624. And, a sample 1628 is in turn affixed to the sample holder 1626. The sample holder 1626 comprises another linear stage, which is configured to allow for gross adjustment of sample height, substantially along the Z-axis. Finally, a controller 1630 is configured to control operation of the laser source 1610, the galvanometers 1618X-Y, the linear stage 1622, and the 2-axis stage 1624. The controller 1630 comprises a display, a graphical user interface, and a mouse and a keyboard for interfacing with an operator.

For the tests, samples 1628 are formed out of acrylic (PMMA). A list of sample types includes: 1.) an undoped (clear) acrylic, 2.) a tinted (grey) acrylic containing a conventional colorant which may be considered a dopant, and 3.) an acrylic doped with a nanoparticulate material specifically to increase absorption of near-infrared laser energy. The undoped acrylic was cut from clear off-the-shelf acrylic bar stock having transverse dimensions of 1"×¼". The grey tinted doped acrylic sample was injected molded in a rectangular block having dimensions of 50 mm×25 mm×5 mm nominally. The grey tinted doped acrylic was injected molded using Plexiglas V825-100 (Atofina Clear Acrylic, PMMA) resin with 1% Transparent Grey Colorant (Clariant OC9SAF-UN7903TR). Finally, the nanoparticle doped samples were injected molded in a rectangular block having dimensions of 50 mm×25 mm×5 mm nominally. The nanoparticle doped acrylic was injected molded using PMMA (Chimei Acryrex CM-205) compounded with 0.1% by mass Antimony Tin Oxide (ATO) nanoparticulate (Nanophase NanoArc® Antimony Tin Oxide [ATO]). NanoArc® ATO nanopowder comprises 100% crystalline, non-porous, non-agglomerated particles having a mean size of 15 nm and a specific surface area of 60 $m^2/g$. The ATO powder was formulated specifically to absorb near infrared energy while still allowing transmission of light in the visible range.

For the tests, many samples were irradiated. 3 exemplary samples are described in detail below. During irradiation, each sample is placed in the sample holder and multiple lines are scanned across a full width of the sample (e.g., along the X-axis) at a rate of 10 mm/s. Lines are stepped at various depths (e.g., along the Z-axis) within the sample, typically from a top surface of the sample to a depth of about 1 mm. Each line is separated from other lines lengthwise (e.g., along the Y-axis) on the sample, typically by 4 mm. Parameters associated with these 3 samples are disclosed in a table below:

and completeness of colloidal dispersion of the dopant. Although, scattering is observed light appears to pass through without being darkened or attenuated (i.e., through absorption). FIG. 17B shows a side view of an edge of the sample 1700. One or more microchannels 1710 can be seen from a side view in FIG. 17B. FIG. 17C shows a higher magnification of a side view of a microchannel 1710. FIG. 17D shows a top view of a microchannel 1710 under magnification.

Figure 18A:
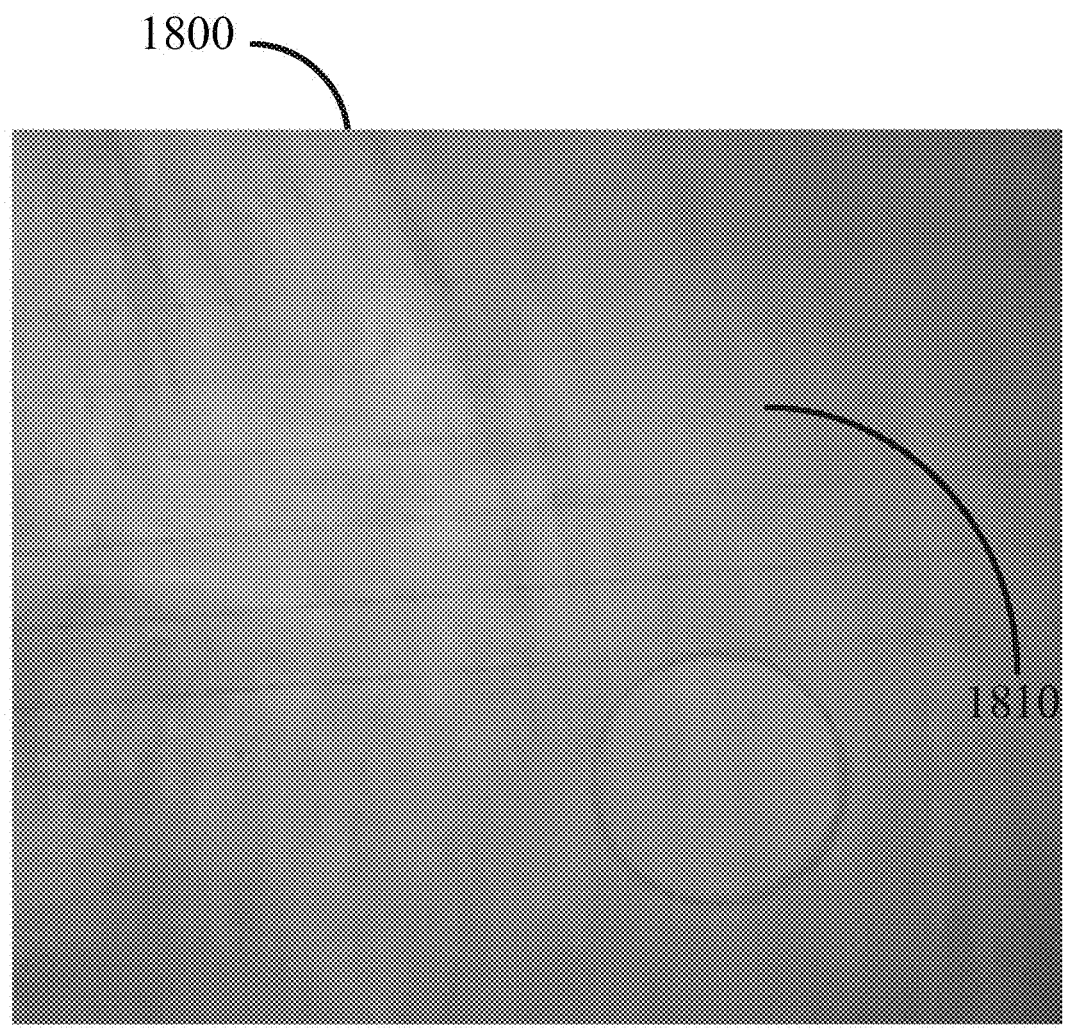
FIG. 18A is an image of a tinted grey doped acrylic block, according to some embodiments.
Figure 18B:
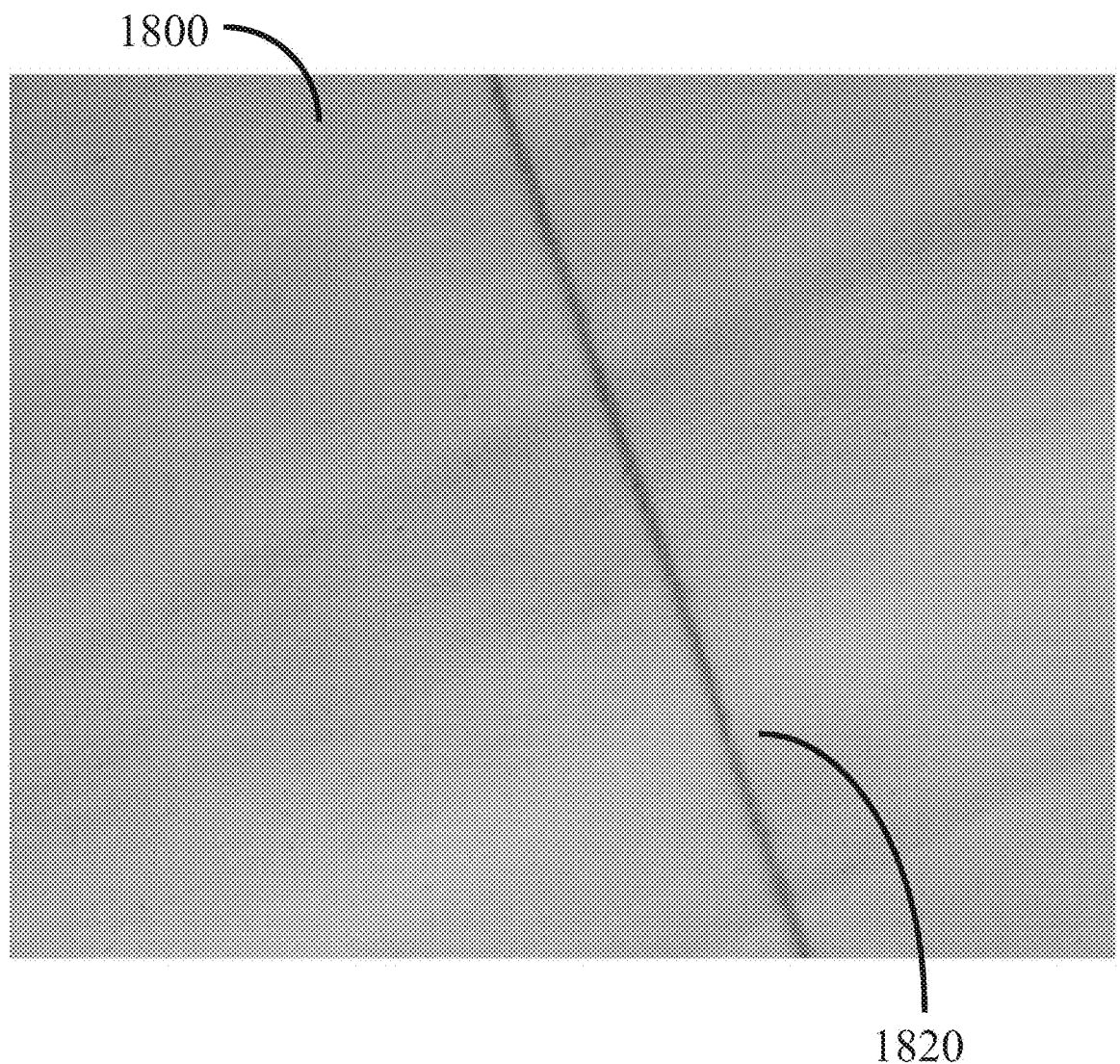
FIG. 18B is a microscope image of a tinted grey doped acrylic block irradiated according to some embodiments.
Figure 18C:
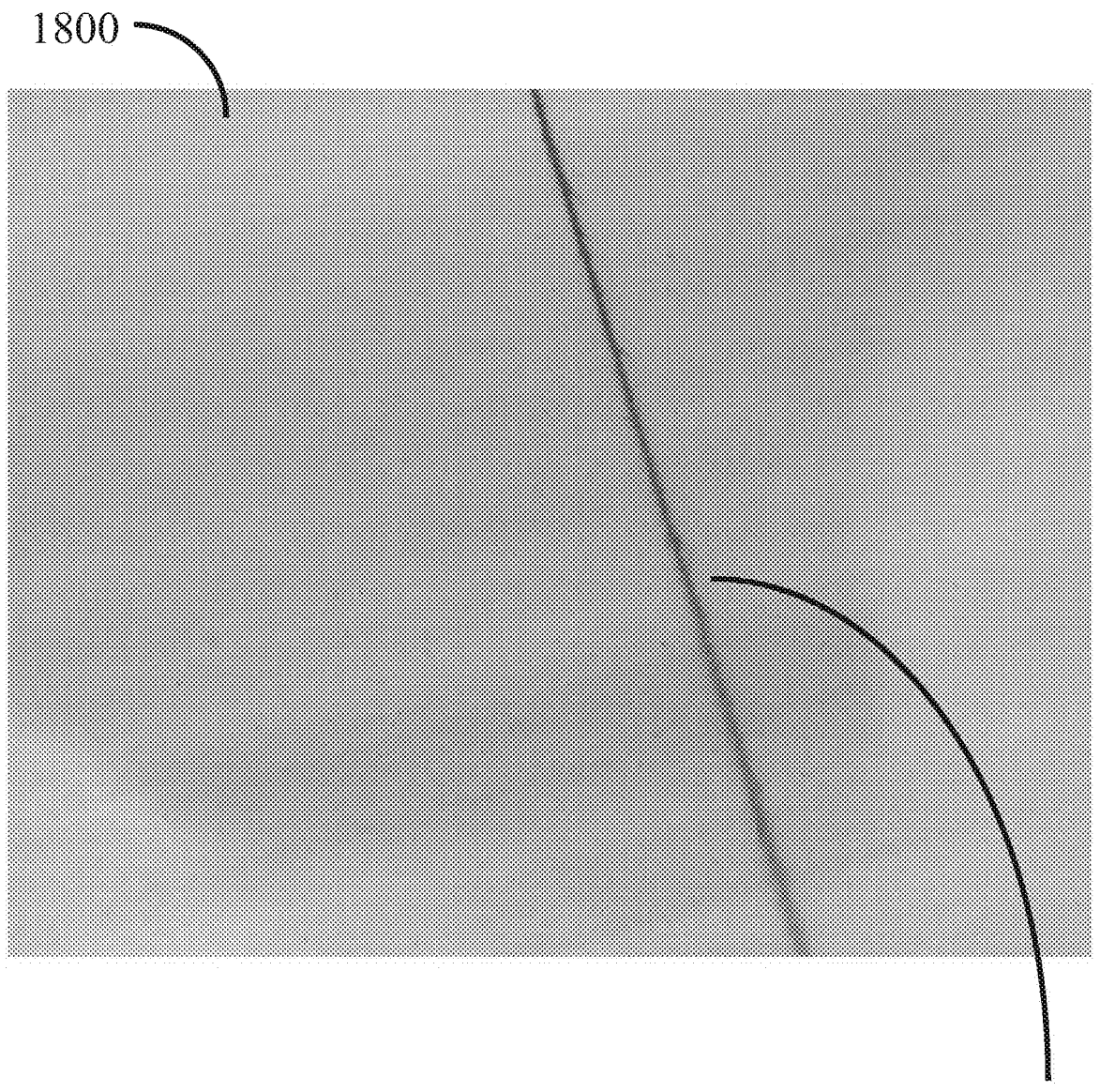
FIG. 18C is a microscope image of a tinted grey doped acrylic block irradiated according to some embodiments.

FIGS. 18A-18C show the grey tinted doped acrylic sample 1800 after undergoing irradiation. FIG. 18A shows a low magnification image of the tinted doped acrylic sample 1800. One or more microchannels 1810 can be seen within the sample 1800. Also, it should be noted from FIG. 18A that the tinted doped sample 1800 could not be easily seen through, as the amount of tint and thickness of the sample greatly attenuated visible light. FIG. 18B shows a magnified image of a first microchannel 1820 in the tinted doped sample 1800. The first microchannel was formed with a repetition rate of 100 Hz. FIG. 18C shows a second microchannel 1830 formed in the tinted doped sample 1800. The second microchannel was also formed with a repetition rate of 100 Hz. It was found that microchannels formed at 200 Hz resulted in microcracking within the tinted doped sample 1800.

Figure 19A:
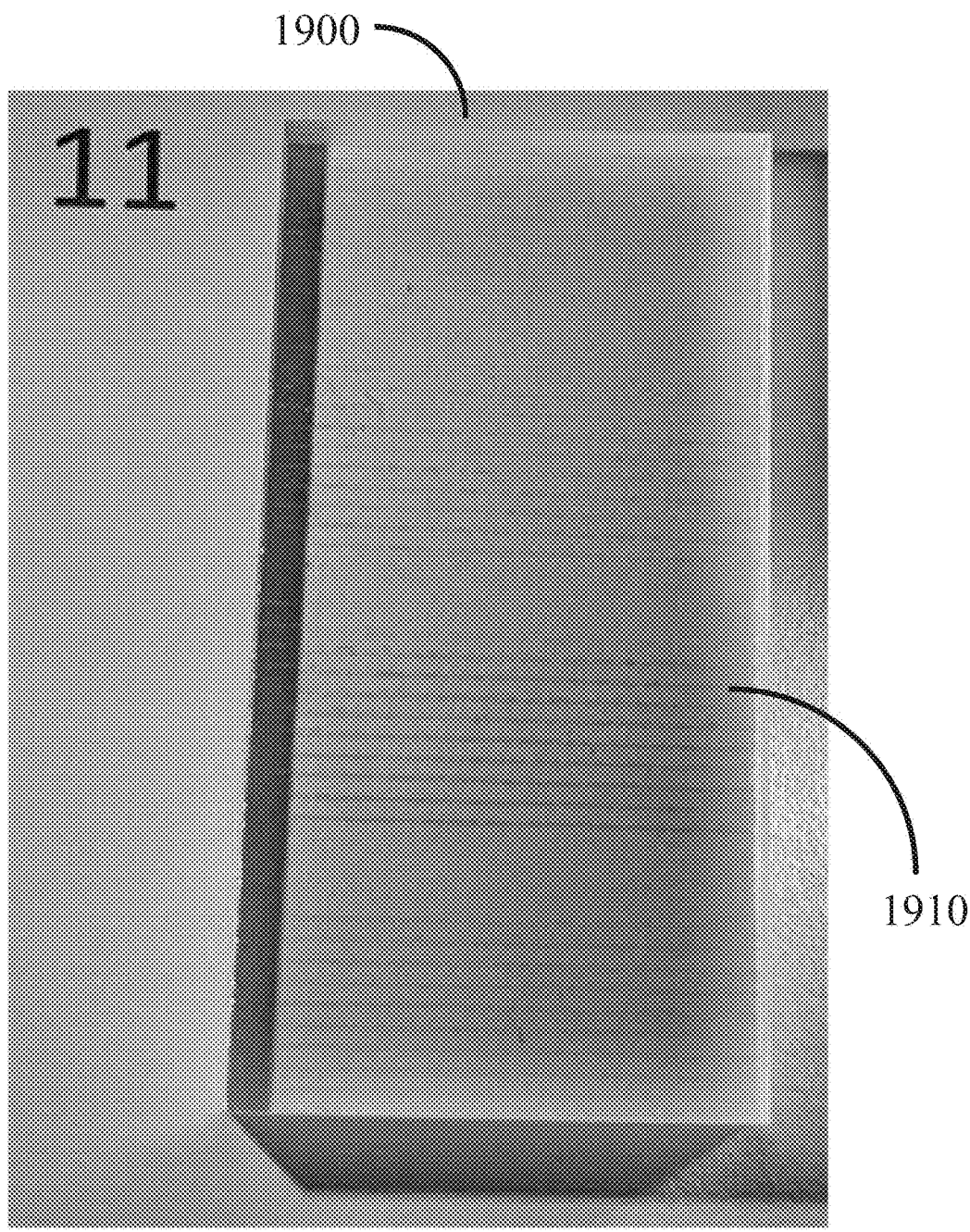
FIG. 19A is an image of a clear undoped acrylic block irradiated according to some embodiments.
Figure 19B:
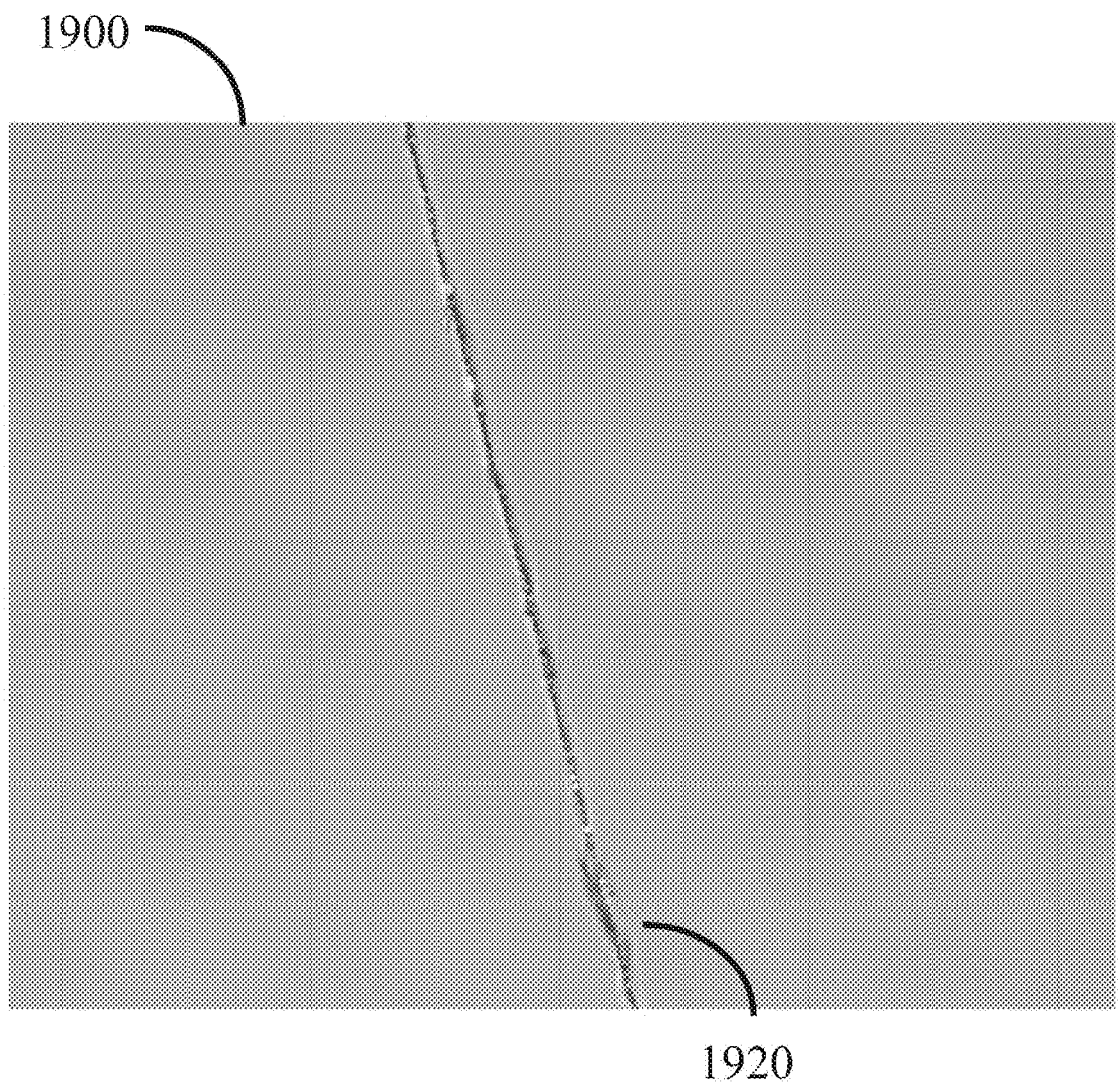
FIG. 19B is a microscope image of a clear undoped acrylic block irradiated according to some embodiments.
Figure 19C:
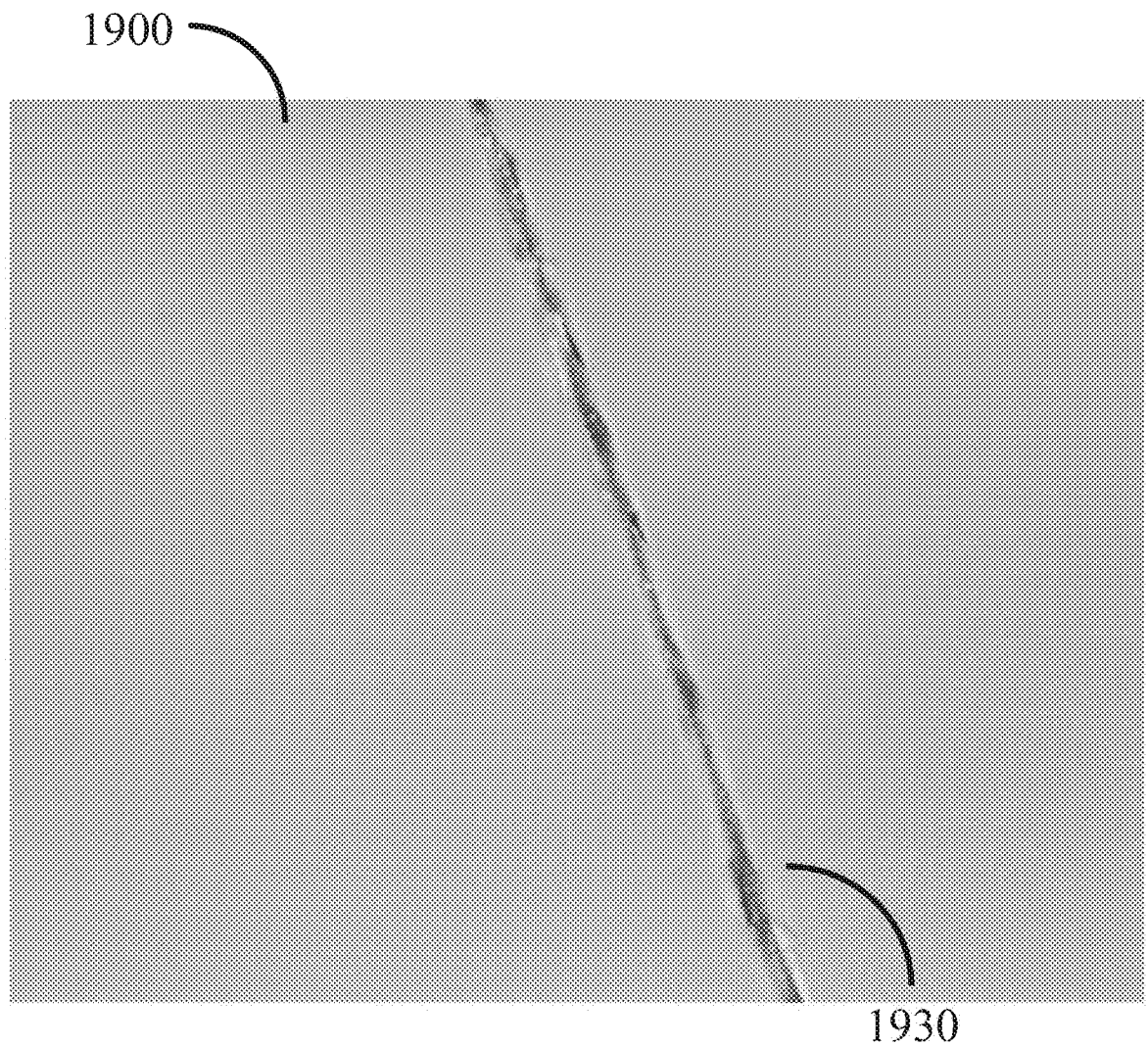
FIG. 19C is a microscope image of a clear undoped acrylic block irradiated according to some embodiments.

FIGS. 19A-19C show the undoped clear acrylic sample 1900 after undergoing irradiation. FIG. 19A shows a low magnification image of the clear acrylic sample 1900. One or more microchannels 1910 can be seen within the sample 1900. It is apparent from FIG. 19A that the clear sample 1900 is optically clear. FIG. 19B shows a magnified image of a first microchannel 1920 in the clear sample 1900. The first microchannel 1920 was formed with a repetition rate of 100 Hz. The first microchannel 1920 was determined to comprise inconsistent features, discontinuous microchannels, and microcracking. FIG. 19C shows a second microchannel 1930 formed in the tinted sample 1900. The second microchannel 1930 was formed with a repetition rate of 200

| Sample ID | Material | Laser Parameters | Pattern | Associated FIGS. |
|---|---|---|---|---|
| 9 | Nanoparticle doped Acrylic | Rep. Rate: 200 Hz, Pulse Duration: 10 ps, Pulse Energy: 200 µJ | 10 lines, 4 mm line spacing, 0-1 mm depth, 0.1 mm depth spacing | FIGS. 17A-17D |
| 10 | Tinted grey Doped Acrylic | Rep. Rate: 200 Hz and 100 Hz, Pulse Duration: 10 ps, Pulse Energy: 200 µJ | 10 lines, 4 mm line spacing, 0-1 mm depth, 0.1 mm depth spacing | FIGS. 18A-18C |
| 11 | Undoped clear Acrylic | Rep. Rate: 200 Hz, 150 Hz, and 100 Hz, Pulse Duration: 10 ps, Pulse Energy: 200 µJ | 10 lines, 4 mm line spacing, 0-1 mm depth, 0.1 mm depth spacing | FIGS. 19A-19C |

Figure 17A:
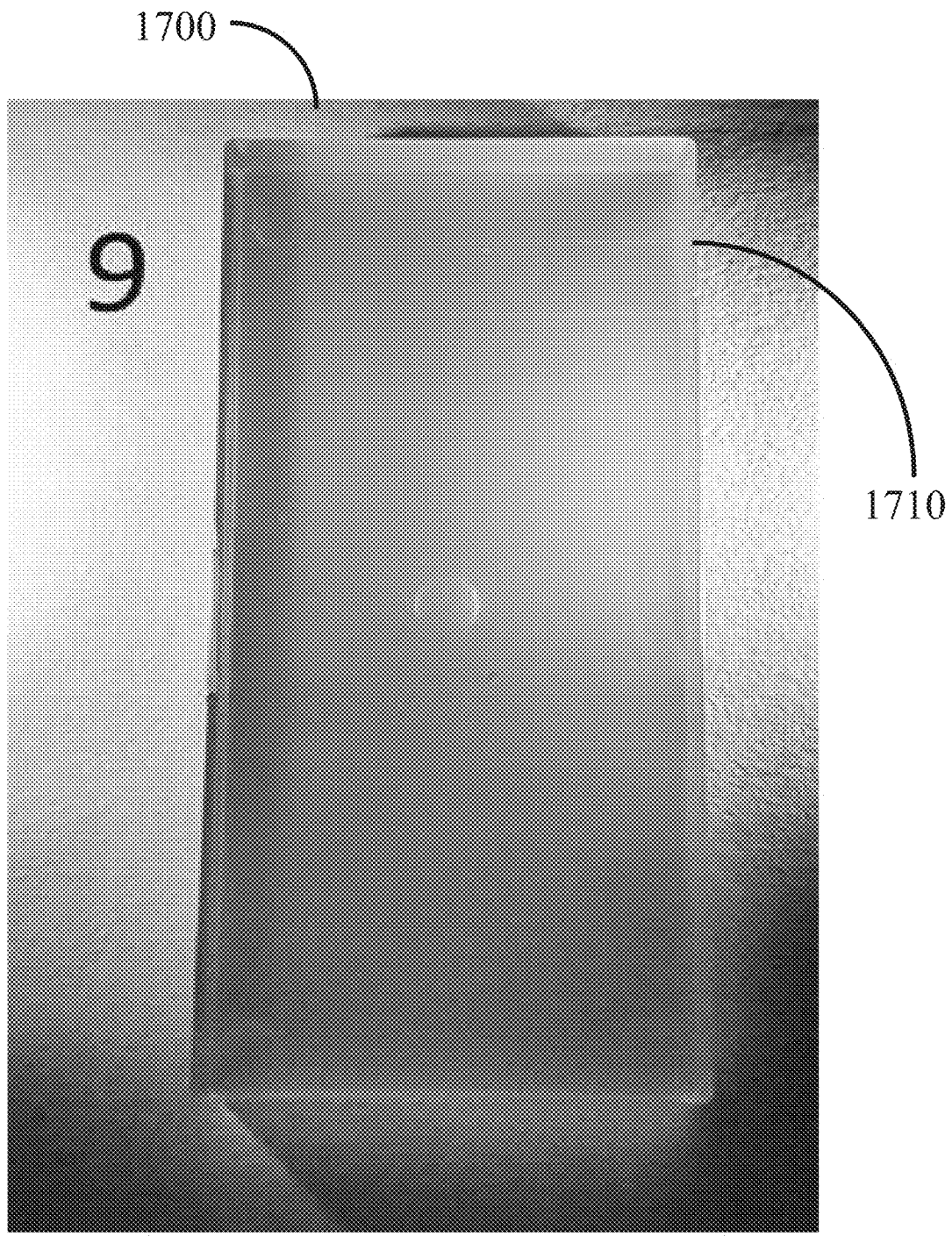
FIG. 17A is an image of a nanoparticle doped acrylic block, according to some embodiments.
Figure 17B:
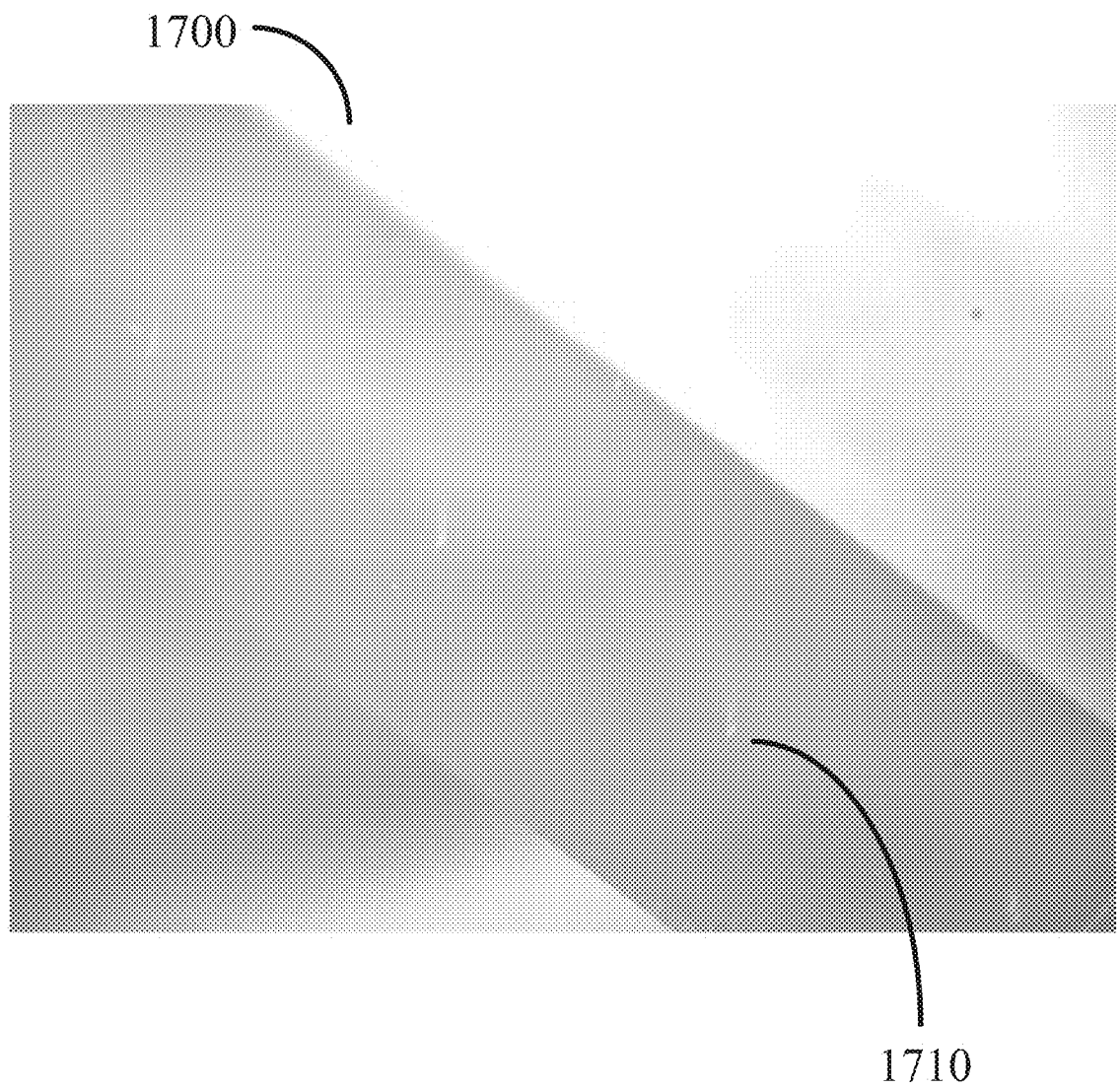
FIG. 17B is an image of a side of a nanoparticle doped acrylic block, according to some embodiments.
Figure 17C:
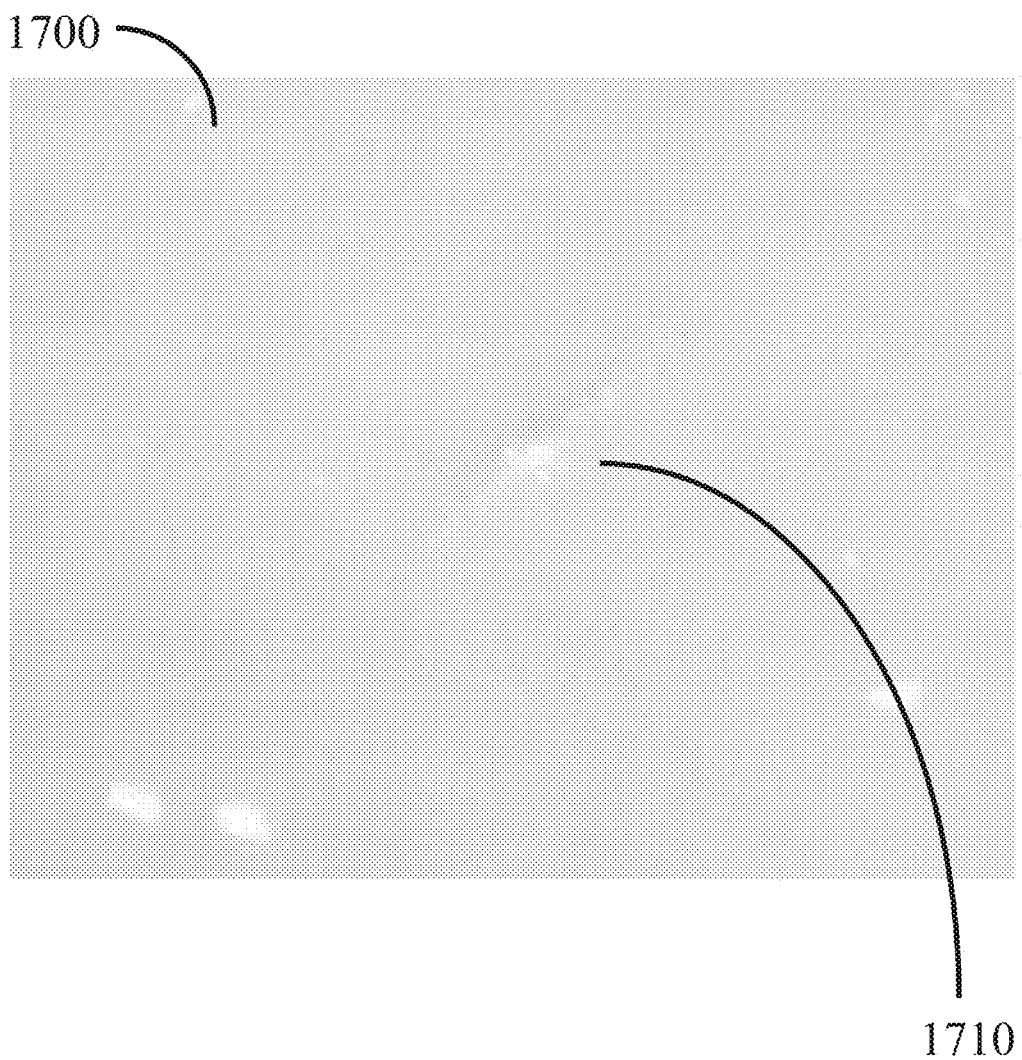
FIG. 17C is a microscope image of a side of a nanoparticle doped acrylic block irradiated according to some embodiments.
Figure 17D:
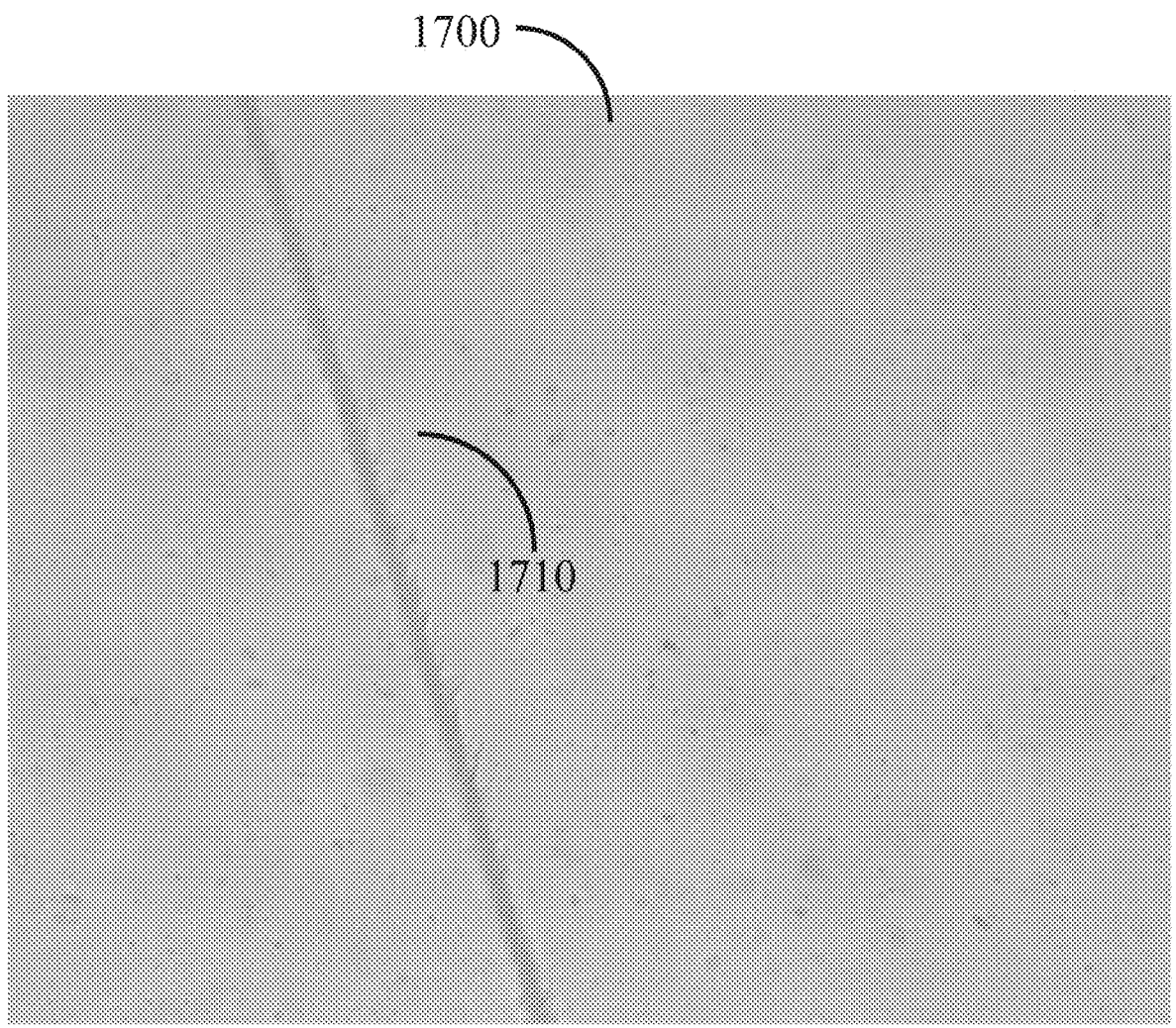
FIG. 17D is a microscope image of a nanoparticle doped acrylic block irradiated according to some embodiments

FIGS. 17A-17D show the nanoparticle doped acrylic sample after undergoing irradiation. FIG. 17A shows a low magnification image of the nanoparticle doped acrylic sample 1700. One or more microchannels 1710 can be seen within the sample 1700. It should be noted from FIG. 17A that the sample 1700 is cloudy. This phenomenon is exacerbated by photography and the sample can actually be seen through, although scattering is evident. This is because introduction of nanoparticle dopant increases scattering within the sample 1700.

In some embodiments, nanoparticle doping is achieved, which does not introduce notable scattering at visible wavelengths. Parameters that affect scattering in visible wavelengths are concentration of dopant, size of nanoparticles, Hz. The second microchannel 1930 was also found to present with inconsistent features, discontinuous microchannels, and microcracking.

In summary of these results, it is apparent that doped acrylic achieved more consistent results with fewer cracks and discontinuities than undoped acrylic. Likewise, the nanoparticle doped acrylic performed comparably with the tinted acrylic. While, the tinted acrylic attenuated visible light, the nanoparticle doped acrylic scattered visible light.

According to some embodiments, microchannel formation requires removal of material from the channels after (or simultaneously with) laser irradiation. Methods for removal of material from channels includes, but is not limited to, ultrasonic bath, chemical etching (e.g., wet and vapor), abrasive flow machining, application of vacuum, and application of electrical current to further breakdown debris.

According to some embodiments, microchannel formation requires a sample to allow for void formation without removal of material from the microchannels. For example, in some cases the sample will be at a glassy (e.g., rubber-like) state during irradiation. The glassy material during microchannel formation is more likely to yield and deform about a void formed during laser irradiation. In other cases, the sample is selected for its porosity (e.g., nanocellular PMMA) and material removed during laser irradiation is expelled by expanding plasma into pores within the substrate.

Dopant selection determines plasma formation mechanism and can have other effects (e.g., scatter and absorption at visible wavelengths). To aid in dopant selection, further testing is described below to show examples of dopants for transparent material laser processing. These tests include examples of dopants to induce thermionic plasma and photonic plasma.

DOPANT EXAMPLES

Example 1: Selective Thermionic Plasma Generation in a Doped Transparent Polymer A first doping example further illustrates a system and method for processing selectively a transparent polymer after doping. Referring again to FIG. 2, two acrylic plastic samples (target material) are placed on the motorized staging 230 beneath the focus optic 216. The laser beam is focused using an 8 mm EFL lens (Thorlabs Part No. C240TME-C). A first clear acrylic sample (McMaster-Carr Part No. 8560K239) and a second gray tinted acrylic sample (McMaster-Carr Part No. 8505K721:GRAY) are each staged such that the focal plane of the laser beam 212 is located about 1.5 mm deep into each sample, as it is scanned through the laser beam 212. Both acrylic samples are about ⅛" thick and are irradiated under similar conditions. A Nufern NuQ® laser described in detail above is used. The laser is operated at 20 kHz, 100 ns pulse duration, and 0.5 mJ/pulse. The acrylic plastic samples are scanned during laser irradiation at a rate of 100 mm/s. The spectrometer is adjusted to capture light over a 5000 ms period and trigger capturing in response to operation of the laser source.

Figure 20:
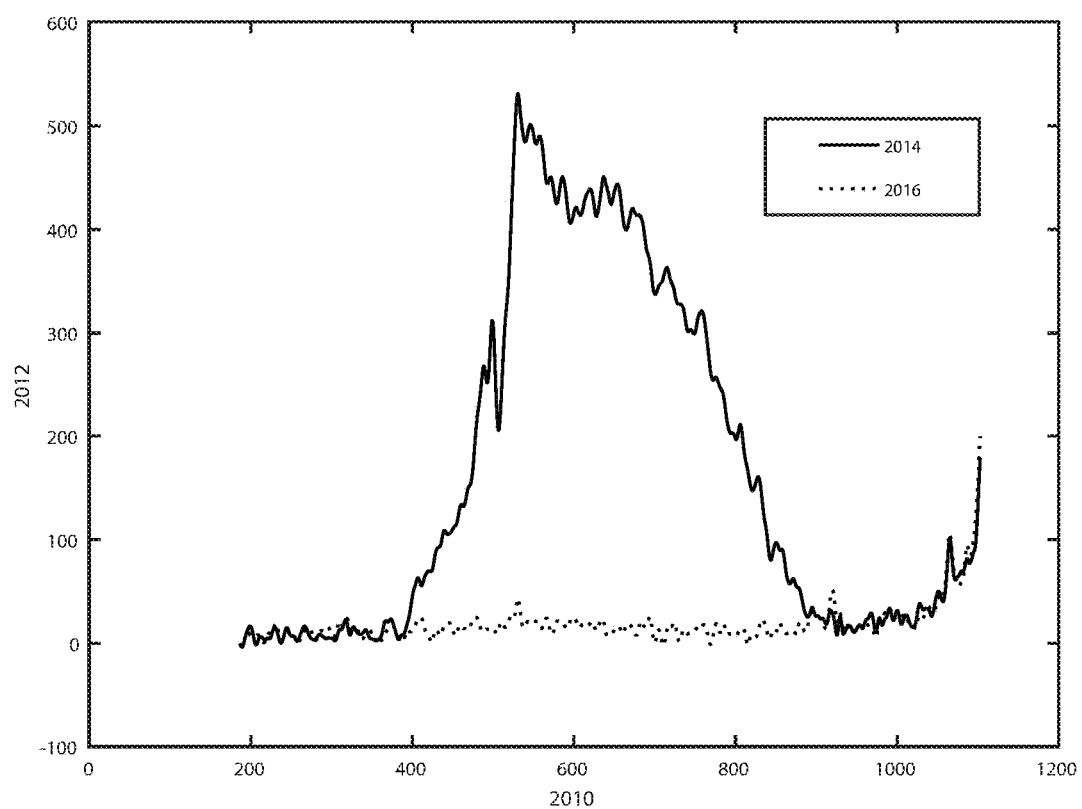
FIG. 20 is a plot showing light spectrum collected during irradiation of a doped and an undoped acrylic block, according to some embodiments.

FIG. 20 illustrates an exemplary spectra measurement of acrylic plastic samples undergoing irradiation according to the above conditions. Presence of broadband visible light (having wavelength of about 400 nm to about 800 nm) in the acrylic spectra may indicate plasma generation in the sample (e.g., target material 218). The visible light is emitted during plasma formation and cooling. Wavelength in nanometers is shown along a horizontal axis, 2010. Relative intensity is shown along a vertical axis 2012. Tinted acrylic spectrum, 2014 and a clear acrylic spectrum 2016 are illustrated in FIG. 20. It can be observed in FIG. 20 that visible light is emitted during irradiation of the tinted acrylic and absent during irradiation of the clear acrylic. The tinted acrylic spectrum 2014, shows a measurement taken during irradiation of the gray tinted acrylic sample, and the clear acrylic spectrum 2016 shows a measurement taken during irradiation of the clear acrylic sample. The tinted acrylic spectrum 2014 is indicative of the presence of a broad-spectrum light during irradiation centered at about 600 nm and covering the visible spectrum, while the clear acrylic spectrum 2016 is indicative of a lack of visible light during irradiation.

Commonly, plasma is thought to be associated with narrowband light (e.g., laser induced breakdown spectroscopy [LIBS]). However, the narrowband light often associated with a plasma are taken from a single plasma event, usually as the plasma cools. Instead, spectra of multiple plasma events as they are formed and cooled appears spectrally as a broadband light. Referring again to the conditions for lasing, assuming plasma is formed with each laser pulse there will be about 1,000,000 plasma events (laser pulse rate of 20 kHz over a 5000 ms period) as the spectrometer gathers data.

Both acrylic samples were inspected under magnification post-irradiation. No markings are visible on the clear acrylic sample. Markings consistent with plasma formation are found in the tinted acrylic sample at a depth of about 1.5 mm below the surface. Example 1 therefore shows that plasma formation and laser material processing in a transparent material may be selectively performed through doping of the transparent material.

Example 2: Linear (Thermal) Narrowband Absorption Dopants

Figure 21A:
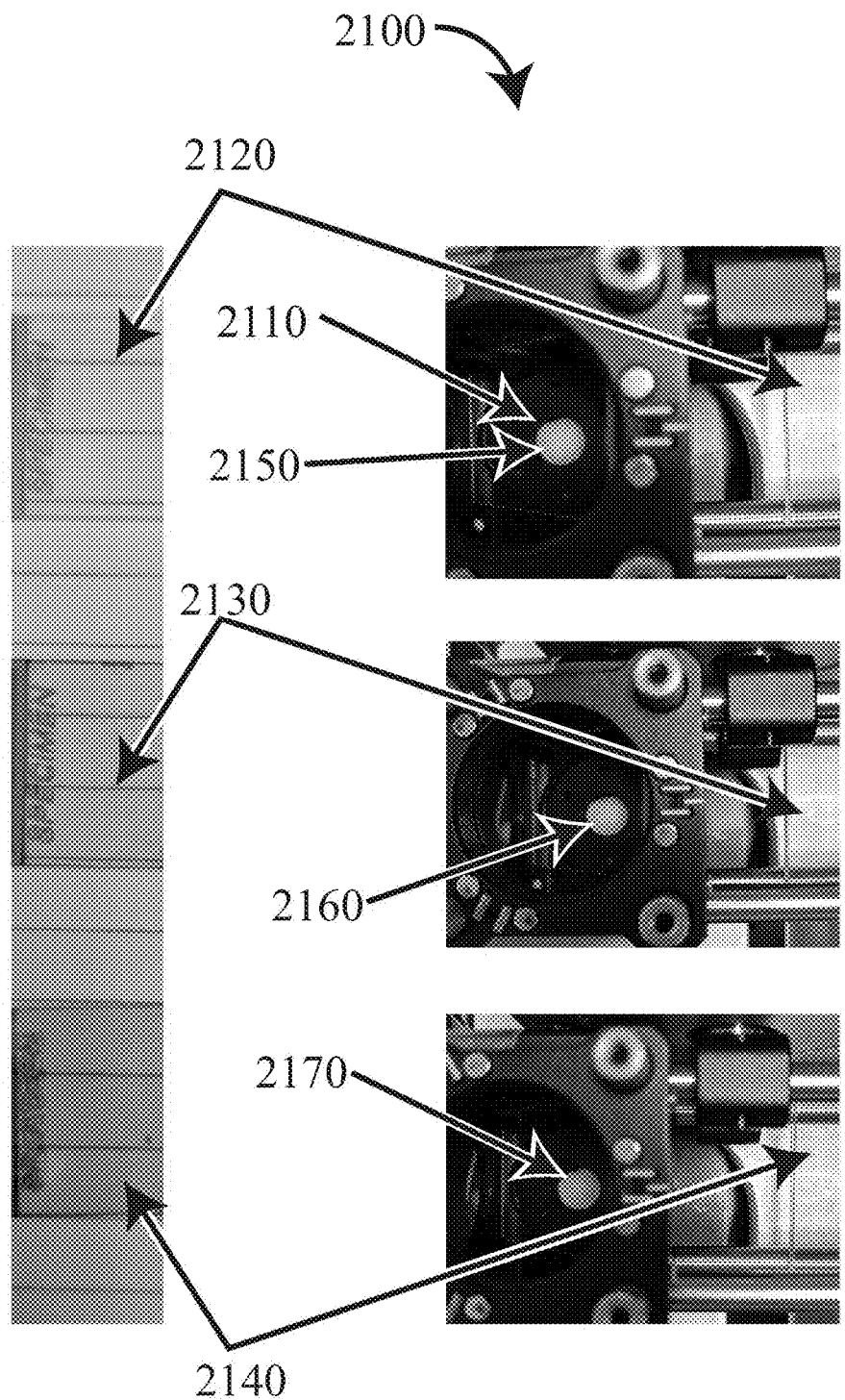
FIG. 21A is a series of images showing attenuation of a laser beam using a narrowband dopant, according to some embodiments.

According to some embodiments, an absorbing material is added as a dopant to aid in laser induced thermal breakdown (LITB). Referring to FIG. 21A, a series of images 2100 show absorbing pigments and their effect on a 1060 nm laser beam. A 1060 nm laser beam having 8 mm diameter is delivered to a fluorescing disk 2110 that fluoresces green when near IR radiation is applied. Three slides are prepared, the first slide 2120 contains water, the second slide 2130 contains NIR1031M pigment from QCR Solutions Corporation of Port St Lucie, Fla., in acetone, and the third slide 2140 contains NIR1054B from QCR Solutions Corporation of Port St Lucie, Fla. in water. It can be seen from the images 2100 that pigment in the second slide only slightly affects transmission of visible light (see image 2160). When the first slide with water 2120 is placed in the laser beam path, an intensity of the laser beam passing through water (as indicated qualitatively by the fluorescing disk 2110) is generally unaffected (see image 2150). When the second slide 2130 with NIR1031M 2130 is placed in the laser beam path, an intensity of the laser beam passing through NIR1031M is attenuated (see image 2160). Likewise, when the NIR1054B slide 2140 is placed in the laser beam path, an intensity of the laser beam passing through the NIR1054B is almost fully attenuated (see image 2170). It is therefore shown that a pigment having peak absorption about a laser wavelength may absorb the laser beam intensity and not drastically affect the visible (e.g., transparent properties of a material). The qualitative results demonstrated with reference to FIG. 21A are further supported quantitatively by disclosure related to narrowband pigment doping of samples shown in FIG. 21B.

An experiment is conducted to illustrate a doping process for a thermoplastic using a narrowband pigment. An optically clear monomer (Hydroxyethyl)methacrylate (HEMA) is combined with a crosslinker, Azobisisobutyronitrile (AIBN) and molded into polymer disks. After molding, the disks are optically polished with increasingly fine grits down to a 3 micrometer polishing grit.

A control disk contains only HEMA; and, a doped disk contains NIR1031M pigment from QCR Solutions Corporation of Port St Lucie, Fla. The NIR1031M pigment is introduced along with a solvent during the polymerization process. The NIR1031M pigment is specified to have peak absorption of 210 L/g*cm at 1060 nm when doped into HEMA. The narrow band pigment is introduced to the HEMA in a concentration of 0.2 g/L. The doped disk therefore has an optical density per thickness of 42/cm at a wavelength of about 1060 nm.

Figure 21B:
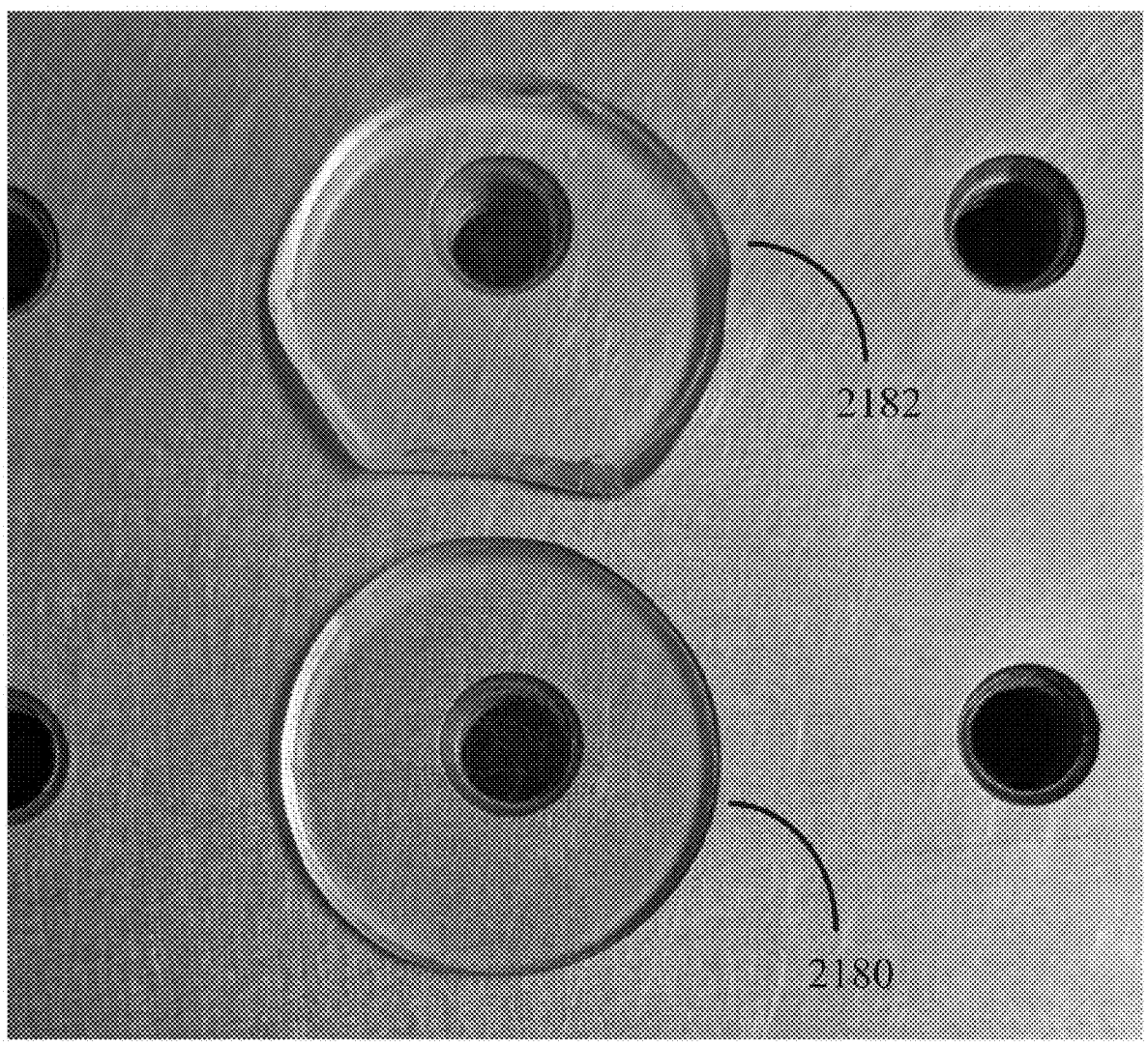
FIG. 21B is an image showing doped and undoped hydroxyethyl methacrylate (HEMA) blocks, according to some embodiments.

Referring now to FIG. 21B, although the doped disk exhibits a very high absorption at 1060 nm, the doped disk 2180 is only slightly less clear in visible wavelengths when compared to the control disk 2182.

Example 3: Laser Induced Optical Breakdown (LIOB) Dopants

Absorbing pigments have been described above for aiding in laser induced thermal breakdown. In some embodiments, a dopant is used to aid in laser induced optical breakdown. A dopant material may be selected that undergoes optical breakdown with less optical intensity than a transparent substrate material. For example, LIOB dopants may be selected based upon their susceptibility to two-(or multi-) photon optical breakdown, or other non-linear optical absorption mechanisms. In some embodiments, dopant materials may be selected based upon susceptibility to ionization (or ionization energy of their constituent materials). Tests are described below illustrate potential transparent dopant materials having different thresholds for LIOB.

Optical windows including different materials are selected for testing. The different optical windows are made of different materials: NaCl, KBr, Sapphire, and Fused Silica. A Q-Switched Nd:Yag laser (Quantel Q-Smart 450 from Lumibird Group of Cournon d'Auvergne Cedex, France) is used along with an optical chain to deliver a focused laser pulse at each window sample. Neutral density (ND) filters are used to attenuate the laser and a Q-Switch delay parameter is used to vary the amount of energy delivered by each laser pulse.

Figure 22:
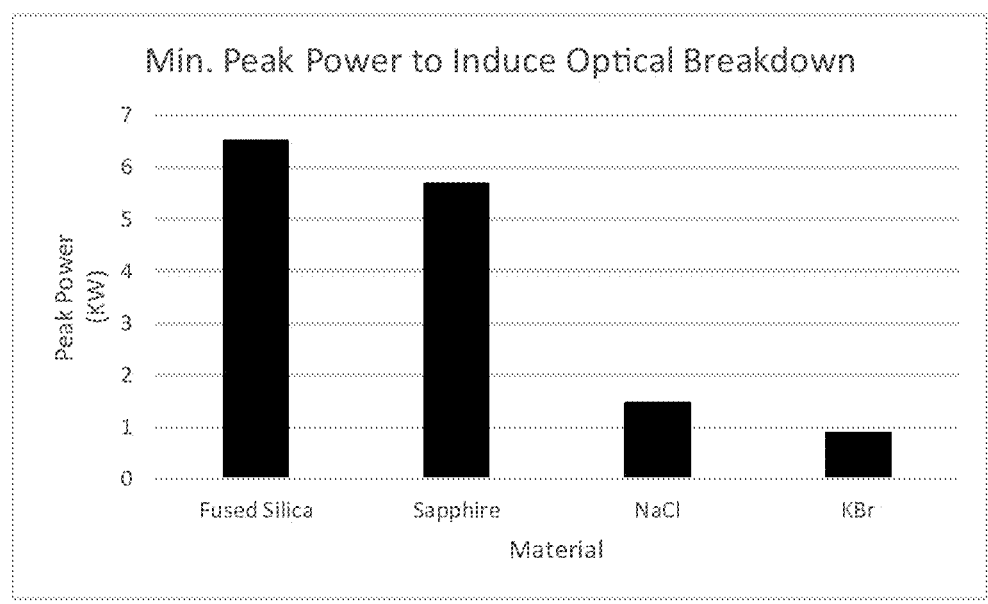
FIG. 22 is a bar graph showing experimentally determined peak power thresholds for optical breakdown in transparent dopant materials, according to some embodiments.

The laser is attenuated with ND filters having a cumulative OD of 3.6. The laser beam is focused using an 8 mm EFL lens (Thorlabs Part No. C240TME-C). A minimum amount of energy needed to induce a plasma in each window is discovered by varying the pulse energy low enough until no plasma is formed and then increasing the pulse energy until a plasma is first observed. For this study, focal region size is assumed constant within the materials. Results from the tests are shown in FIG. 22 and enumerated in the table below:

| Material | Edmunds Optic Part No. | Q-Switch Delay (μS) | Estimated Peak Power (KW) | Percentage of Max. Material Threshold (%) |
|---|---|---|---|---|
| Fused Silica | 45-311 | 80 | 6.5183888 | 100% |
| Sapphire | 48-919 | 90 | 5.6806368 | 87% |
| NaCl | 68-817 | 140 | 1.45696 | 22% |
| KBr | 68-809 | 160 | 0.8792 | 13% |

The minimum peak power needed to induce breakdown in each material is not constant. Materials containing electron donors (NaCl, KBr) breakdown with less power and can be suitable dopants to lower the LIOB threshold of a material. As these materials are all transmissive at the laser wavelength (1064 nm) it is believed that breakdown is photon induced rather than thermionic.

Once plasma is generated within a material, the plasma may propagate within the material regardless of the materials susceptibility to optical induced breakdown. In some cases, propagation occurs through avalanche ionization. Additionally, once a plasma is formed, the plasma becomes increasingly absorbing at the laser wavelength. So, a material that is transmissive in a solid phase, becomes an absorber in a plasma phase. The plasma therefore once formed, in some cases, linearly absorbs energy for propagation from an ongoing laser pulse.

Additional Embodiments

Although, the above disclosure has focused on use of this technology for generation of microfluidic channels, additional uses and embodiments exist. A non-comprehensive list of these uses and embodiments follow.

According to some embodiments a 2-step procedure may be employed for laser processing doped transparent material. According to the 2-step procedure a dopant is first added to the material in a generally inactive state (i.e., generally not altering a laser induced breakdown threshold of the material). A first step of the 2-step process is to first activate the inactive dopant. An exemplary dopant is a photosensitive material, such as used in photolithography (e.g., photoresist). Other non-light-based methods of activating the dopant are also conceived, such as through pressure, heat, or electrical and magnetic fields. Once, the dopant is activated it now has a lower threshold of laser induced breakdown. At which point, a second step of the 2-step process may be undertaken, which is to induce plasma with a laser as described above. A potential advantage of the 2-step process is that it allows for a logical process to be encoded into a material. For example, breakdown will only occur at locations where there is an activated dopant, and not where the inactive dopant resides, thereby allowing for greater selectivity and control of the process. This has potential applications in digital storage mediums. Additionally, smaller channels (i.e. smaller than a single beam width) may be introduced with the 2-step process as only the regions where dopant has been activated will yield plasma when irradiated. In some cases, channels much narrower than the diffraction limit are formed as a result of 2-step doping.

In some embodiments, the repetition rate of the input laser beam can be faster than the decay rate of the plasma in the target tissue/target material. This can allow for continuous (e.g., temporally continuous, spatially continuous, etc.) generation of plasma. The area of the treatment region/target region (e.g., region in which plasma is generated) can be controlled by changing the repetition rate of the laser beam.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

Approximating language, as used herein throughout the specification and claims, may be applied to modify any quantitative representation that could permissibly vary without resulting in a change in the basic function to which it is related. "Approximately," "substantially, or "about" can include numbers that fall within a range of 1%, or in some embodiments within a range of 5% of a number, or in some embodiments within a range of 10% of a number in either direction (greater than or less than the number) unless otherwise stated or otherwise evident from the context (except where such number would impermissibly exceed 100% of a possible value). Accordingly, a value modified by a term or terms, such as "about," approximately, or "substantially," is not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The articles "a" and "an" as used herein in the specification and in the claims, unless clearly indicated to the contrary, should be understood to include the plural referents. Claims or descriptions that include "or" between one or more members of a group are considered satisfied if one, more than one, or all of the group members are present in, employed in, or otherwise relevant to a given product or process unless indicated to the contrary or otherwise evident from the context. The disclosure includes embodiments in which exactly one member of the group is present in, employed in, or otherwise relevant to a given product or process. The disclosure also includes embodiments in which more than one, or all of the group members are present in, employed in, or otherwise relevant to a given product or process. Furthermore, it is to be understood that the disclosed embodiments provide all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. It is contemplated that all embodiments described herein are applicable to all different aspects of the disclosed embodiments where appropriate. It is also contemplated that any of the embodiments or aspects can be freely combined with one or more other such embodiments or aspects whenever appropriate. Where elements are presented as lists, e.g., in Markush group or similar format, it is to be understood that each subgroup of the elements is also disclosed, and any element(s) can be removed from the group. It should be understood that, in general, where the disclosed embodiments, or aspects of the disclosed embodiments, is/are referred to as comprising particular elements, features, etc., certain embodiments of the disclosure or aspects of the disclosure consist, or consist essentially of, such elements, features, etc. For purposes of simplicity those embodiments have not in every case been specifically set forth in so many words herein. It should also be understood that any embodiment or aspect of the disclosure can be explicitly excluded from the claims, regardless of whether the specific exclusion is recited in the specification. For example, any one or more active agents, additives, ingredients, optional agents, types of organism, disorders, subjects, or combinations thereof, can be excluded.

Where ranges are given herein, embodiments of the disclosure include embodiments in which the endpoints are included, embodiments in which both endpoints are excluded, and embodiments in which one endpoint is included and the other is excluded. It should be assumed that both endpoints are included unless indicated otherwise. Furthermore, it is to be understood that unless otherwise indicated or otherwise evident from the context and understanding of one of ordinary skill in the art, values that are expressed as ranges can assume any specific value or subrange within the stated ranges in different embodiments of the disclosure, to the tenth of the unit of the lower limit of the range, unless the context clearly dictates otherwise. It is also understood that where a series of numerical values is stated herein, the disclosure includes embodiments that relate analogously to any intervening value or range defined by any two values in the series, and that the lowest value may be taken as a minimum and the greatest value may be taken as a maximum. Numerical values, as used herein, include values expressed as percentages.

Any embodiment in which a numerical value is prefaced by "about" or "approximately" includes an embodiment in which the exact value is recited. For any embodiment of the disclosure in which a numerical value is not prefaced by "about" or "approximately", the disclosure includes an embodiment in which the value is prefaced by "about" or "approximately." "Approximately" or "about" can include numbers that fall within a range of 1% or in some embodiments within a range of 5% of a number or in some embodiments within a range of 10% of a number in either direction (greater than or less than the number) unless otherwise stated or otherwise evident from the context (except where such number would impermissibly exceed 100% of a possible value).

It should be understood that, unless clearly indicated to the contrary, in any methods claimed herein that include more than one act, the order of the acts of the method is not necessarily limited to the order in which the acts of the method are recited, but the disclosure includes embodiments in which the order is so limited. It should also be understood that unless otherwise indicated or evident from the context, any product or composition described herein may be considered "isolated."

As used herein the term "comprising" or "comprises" is used in reference to compositions, methods, and respective component(s) thereof, that are essential to the disclosed embodiments, yet open to the inclusion of unspecified elements, whether essential or not.

As used herein the term "consisting essentially of" refers to those elements required for a given embodiment. The term permits the presence of additional elements that do not materially affect the basic and novel or functional characteristic(s) of that embodiment of the disclosure.

The term "consisting of" refers to compositions, methods, and respective components thereof as described herein, which are exclusive of any element not recited in that description of the embodiment.

Although a few variations have been described in detail above, other modifications or additions are possible.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    depositing a plurality of dopant particles within a predetermined region of a transparent material;
    focusing a laser beam along an optical axis to a focal region that overlaps with at least a portion of the predetermined region, wherein the focal region irradiates at least a first dopant particle of the plurality of dopant particles for a pulse duration within a range of 0.1 nanoseconds to 100 nanoseconds, which is sufficient to allow heat diffusion while selectively generating thermionic plasma within the predetermined region;
    adjusting a parameter of the laser beam to generate a plasma configured to form an inclusion within the transparent material; and,
    scanning the focal region along a path within the transparent material to elongate the inclusion generally along the path;
    wherein the inclusion comprises a sub-surface microfluidic channel.

2. The method of claim 1, wherein the inclusion has a transverse height substantially along the optical axis and a transverse width orthogonal to the transverse height and the path.

3. The method of claim 2, wherein the inclusion has an aspect ratio equal to the transverse height divided by the transverse width, and wherein the aspect ratio is within a range from about 0.05 to about 500.

4. The method of claim 2, wherein at least one of the transverse height and the transverse width is within a range from about 0.5 μm to about 500 μm, and wherein the inclusion comprises a void configured to provide fluidic communication.

5. The method of claim 2, wherein at least one of the transverse height and the transverse width has a value within a range from about 0.05 μm to about 5000 μm.

6. The method of claim 2, wherein the inclusion comprises a localized change in the physical, mechanical, or optical properties of the material.

7. The method of claim 2, wherein the inclusion comprises a void configured to conduct fluid, electrical energy, or thermal energy.

8. The method of claim 1, wherein the path comprises a component vector that is substantially parallel to the optical axis.

9. The method of claim 1, wherein the path comprises 3 orthogonal component vectors.

10. The method of claim 1, wherein the plasma is generated within the first dopant particle.

11. The method of claim 1, wherein the plasma is generated via laser induced thermal breakdown (LITB).

12. The method of claim 1, wherein the plasma is generated via laser induced optical breakdown (LIOB).

13. The method of claim 1, wherein adjusting the parameter of the laser beam comprises adjusting at least one of a power, a pulse energy, a repetition rate, a pulse duration, and a wavelength of the laser beam.

14. The method of claim 1, wherein the plurality of dopant particles include at least one of silicon, silver nanoparticles, metal nanocomposites, dendritic molecules, chromophores, and metal oxide nanoparticles.

15. The method of claim 1, wherein the transparent material comprises at least one of: a polymer, a glass, and a crystal.

16. The method of claim 1, further comprising introducing a fluid into the inclusion, wherein the fluid is configured to remove material from walls of the inclusion.

17. The method of claim 16, wherein the fluid comprises at least one of: a liquid, a gas, a solvent, and an abrasive.

18. The method of claim 1, further comprising introducing a vacuum to the inclusion.

19. The method of claim 1, further comprising heating the transparent material to a predetermined temperature.

20. A system comprising:
    a focus optic configured to focus a laser beam along an optical axis to a focal region that overlaps with at least a portion of a predetermined region of a transparent material that is deposited with a plurality of dopant particles, wherein the focal region irradiates at least a first dopant particle of the plurality of dopant particles for a pulse duration within a range of 0.1 nanoseconds to 100 nanoseconds, which is sufficient to allow heat diffusion while selectively generating thermionic plasma within the predetermined region;
    a controller configured to adjust at least one of a power, a pulse energy, a repetition rate, a pulse duration, and a wavelength of the laser beam to generate plasma in order to form an inclusion within the transparent material, wherein the inclusion comprises a sub-surface microfluidic channel; and,
    a scanner configured to scan the focal region along a path within the transparent material to elongate the inclusion generally along the path.

21. The method of claim 1, wherein the sub-surface microfluidic channel has a depth that changes with location.

22. The method of claim 1, wherein an intensity of the laser beam is $10^{10}$ W/cm$^2$, which is below a threshold of avalanche ionization.

23. The system of claim 20, wherein an intensity of the laser beam is $10^{10}$ W/cm$^2$, which is below a threshold of avalanche ionization.

* * * * *